(12) United States Patent
Ashley

(10) Patent No.: US 10,482,780 B2
(45) Date of Patent: Nov. 19, 2019

(54) POSITIVE REINFORCEMENT BASED AID WITH VISUAL, AUDITORY AND TACTILE REWARDS

(71) Applicant: Plus Up, LLC, Crownsville, MD (US)

(72) Inventor: Adam R. Ashley, Crownsville, MD (US)

(*) Notice: Subject to any disclaimer, the term of this patent is extended or adjusted under 35 U.S.C. 154(b) by 0 days.

(21) Appl. No.: 15/958,524

(22) Filed: Apr. 20, 2018

(65) Prior Publication Data

US 2019/0325766 A1 Oct. 24, 2019

(51) Int. Cl.
| | |
|---|---|
| *G09B 5/06* | (2006.01) |
| *G04F 10/00* | (2006.01) |
| *G09B 19/00* | (2006.01) |
| *G07F 1/06* | (2006.01) |

(52) U.S. Cl.
CPC ............... *G09B 5/06* (2013.01); *G04F 10/00* (2013.01); *G07F 1/06* (2013.01); *G09B 19/00* (2013.01); *G09B 19/0076* (2013.01); *G09B 19/0084* (2013.01); *G09B 19/0092* (2013.01)

(58) Field of Classification Search
CPC G09B 19/00; G09B 19/0076; G09B 19/0092; G09B 19/0084; G09B 5/06; G07F 1/06; G04F 10/00
USPC ........................................................ 434/238
See application file for complete search history.

(56) References Cited

U.S. PATENT DOCUMENTS

| | | | |
|---|---|---|---|
| 4,300,129 A | 11/1981 | Cataldo | |
| 5,189,413 A | 2/1993 | Gaskill et al. | |
| 5,190,459 A | 3/1993 | Determan | |
| 5,197,489 A | 3/1993 | Conlan | |
| 5,285,430 A | 2/1994 | Decker | |
| 5,288,233 A * | 2/1994 | Green | G09B 19/00 434/238 |
| 5,339,295 A * | 8/1994 | Hiromori | G04C 3/002 368/108 |
| 5,349,573 A * | 9/1994 | Hiromori | G04C 3/002 368/108 |
| 5,436,622 A | 7/1995 | Gutman et al. | |
| 5,444,671 A | 8/1995 | Tschannen et al. | |
| 5,470,235 A * | 11/1995 | Papaleo | G09B 19/00 434/238 |
| 5,595,488 A | 1/1997 | Gozlan et al. | |
| 5,679,004 A | 10/1997 | McGowan et al. | |
| 5,697,790 A | 12/1997 | Garland et al. | |
| 5,841,345 A | 11/1998 | Kestenberg | |
| 5,861,797 A | 1/1999 | Becker | |
| 6,042,383 A * | 3/2000 | Herron | G09B 5/065 434/107 |
| 6,170,662 B1 * | 1/2001 | Howes | A63F 9/001 206/232 |

(Continued)

*Primary Examiner* — Jack Yip

(74) *Attorney, Agent, or Firm* — Marc W. Butler; Miles & Stockbridge P.C.

(57) ABSTRACT

A method and system for behavioral performance reinforcement is presented. A behavioral reinforcement device includes a housing with an electronic display, where the electronic display displays a user's behavioral performance both numerically and symbolically. The housing includes a sensor to detect a user input and a token dispenser to dispense tokens. When the sensor detects a pre-defined user input, a controller executes a device activation sequence to turn the device on or a device deactivation sequence to turn the device off.

21 Claims, 24 Drawing Sheets

(56) References Cited

U.S. PATENT DOCUMENTS

| | | | |
|---|---|---|---|
| 6,273,027 B1 * | 8/2001 | Watson | A01K 15/02 119/712 |
| 6,275,159 B1 | 8/2001 | Pinnow et al. | |
| 6,558,165 B1 | 5/2003 | Curry et al. | |
| 6,582,380 B2 | 6/2003 | Kazlausky et al. | |
| 6,724,298 B2 | 4/2004 | Smith | |
| 6,904,001 B1 * | 6/2005 | Rast | A44B 11/008 368/107 |
| 7,196,619 B2 | 3/2007 | Perlman et al. | |
| 8,137,108 B2 | 3/2012 | Hamway et al. | |
| 2001/0029319 A1 | 10/2001 | Kazlausky et al. | |
| 2001/0034259 A1 * | 10/2001 | Luciano | G06Q 10/087 463/16 |
| 2002/0197588 A1 | 12/2002 | Wood et al. | |
| 2004/0063081 A1 | 4/2004 | Lipkins | |
| 2004/0115603 A1 | 6/2004 | Reynolds | |
| 2004/0115605 A1 | 6/2004 | Cooper | |
| 2004/0218732 A1 | 11/2004 | Menard et al. | |
| 2004/0231955 A1 * | 11/2004 | Carter | G07D 9/00 194/217 |
| 2004/0248070 A1 | 12/2004 | Ancier | |
| 2005/0164778 A1 * | 7/2005 | Cooney | A63F 9/0468 463/22 |
| 2005/0244799 A1 | 11/2005 | Skenandore | |
| 2006/0012120 A1 * | 1/2006 | Kash | A63F 3/00 273/242 |
| 2007/0165649 A1 | 7/2007 | Moritz | |
| 2008/0227065 A1 | 9/2008 | Hamway et al. | |
| 2009/0251312 A1 | 10/2009 | Shelton et al. | |
| 2009/0310945 A1 * | 12/2009 | Stallings | G07F 9/02 386/241 |
| 2011/0110198 A1 * | 5/2011 | Bulsink | A63F 11/00 368/96 |
| 2011/0229866 A1 * | 9/2011 | Manieri | G09B 19/00 434/236 |
| 2012/0004031 A1 * | 1/2012 | Barney | A63F 13/428 463/31 |
| 2013/0091453 A1 * | 4/2013 | Kotler | G06Q 30/0209 715/772 |
| 2014/0336473 A1 * | 11/2014 | Greco | A61B 5/486 600/301 |
| 2016/0005320 A1 * | 1/2016 | deCharms | G09B 5/065 434/236 |
| 2017/0115639 A1 * | 4/2017 | Rubin | G04F 3/08 |
| 2018/0350261 A1 * | 12/2018 | Petrone | G09B 19/00 |

* cited by examiner

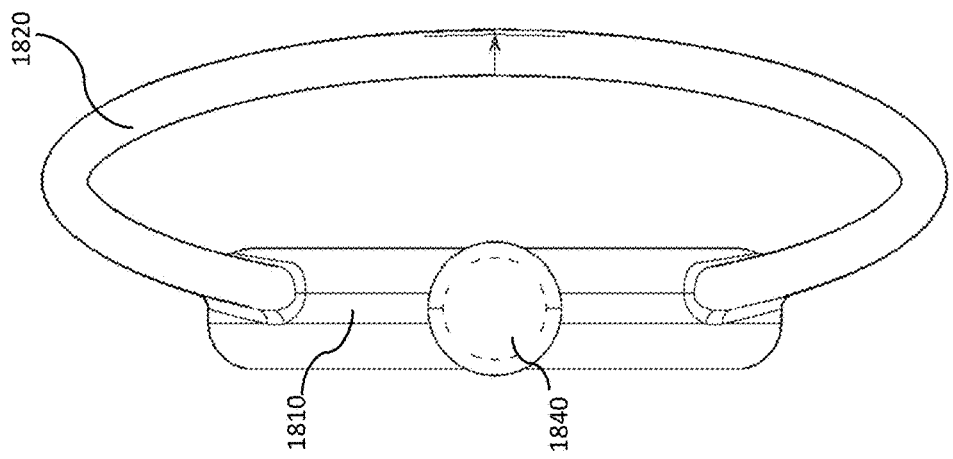
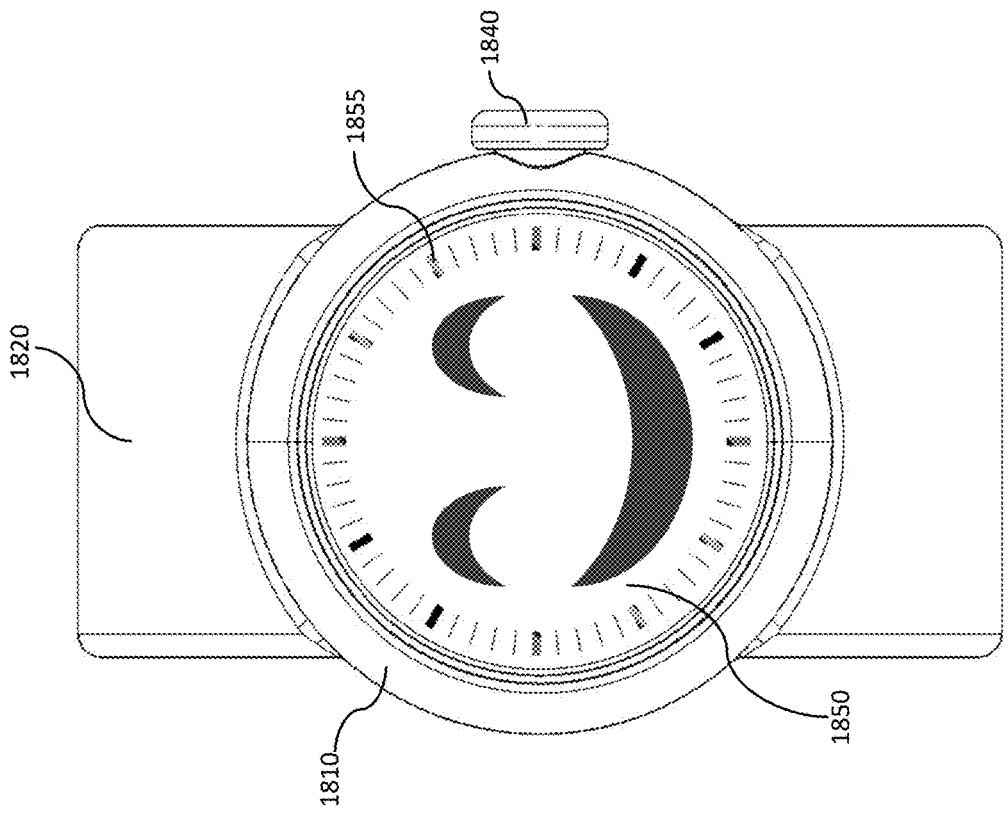

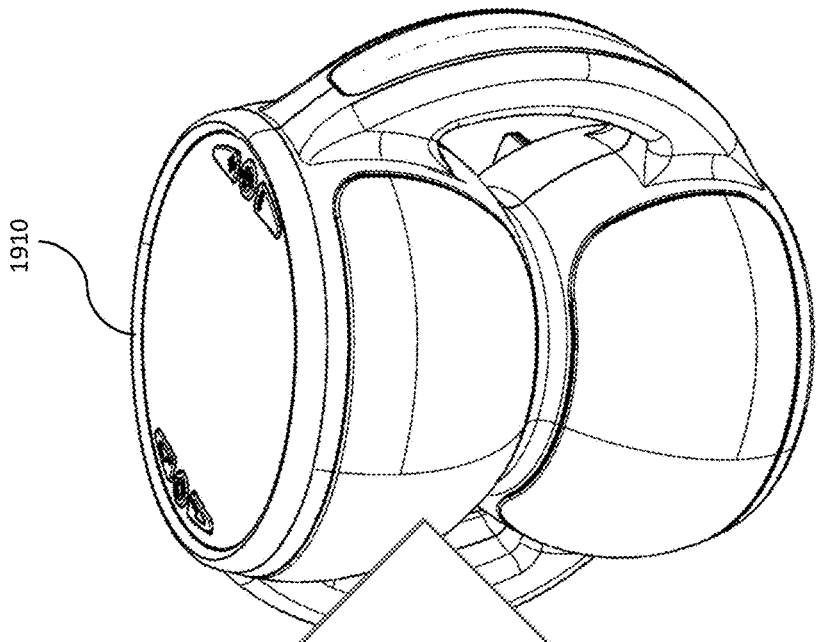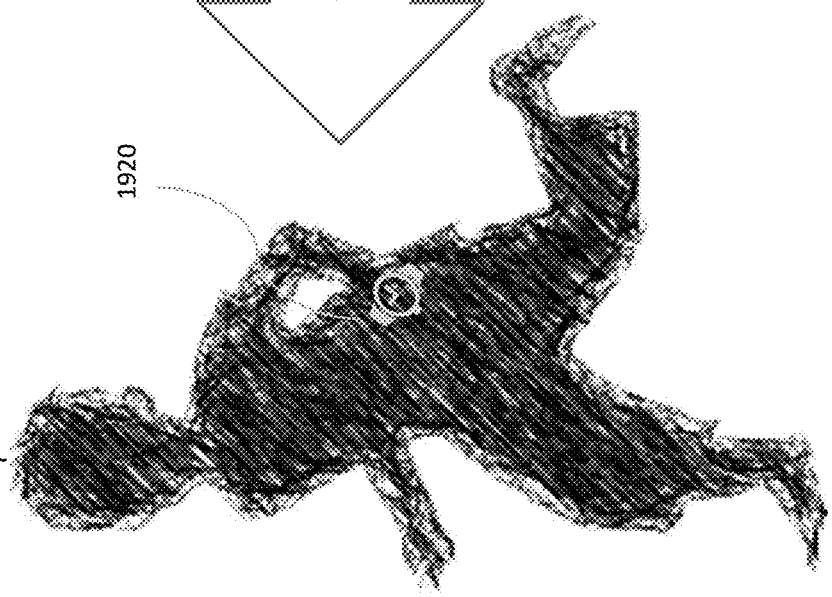
Fig. 19

POSITIVE REINFORCEMENT BASED AID WITH VISUAL, AUDITORY AND TACTILE REWARDS

FIELD

This invention relates to positive behavioral reinforcement devices and methods.

BACKGROUND

Positive behavioral methodologies are a principal concern for most parents and educators. Thus, addressing behavioral issues is of paramount concern. Current approaches to behavioral control typically fall into two main categories. The first consists of analog and digital reward charts, also referred to as "chore charts." These include charts corresponding to a calendar with desired behaviors or chores listed in a column with stars or merits earned or removed for demonstrating these behaviors. Typically, merits or demerits are issued daily.

The second category includes time-out timers directed to support the "timeout" negative reinforcement/punishment method. A child is placed in timeout and the timer is used to measure the amount of time the child will have to undergo the punishment. These approaches to addressing behavioral issues are based on negative reinforcement and punishment rather than approval and encouragement as motivators for good behavior.

BRIEF SUMMARY

Given the foregoing, what is needed is a method and system for providing positive reinforcement to encourage behavioral improvement in children. The ability to interact with a behavioral reinforcement device with a multi-functional system of positive reinforcement, allows a child to begin to understand that their choices directly correspond to the positive feedback they receive. Thus, the present disclosure presents multiple embodiments utilizing a device that includes a timer and internal memory to track and record the amount of time the child is meeting the desired behaviors set forth by their parents, caregivers and teachers.

In an embodiment of the present disclosure, a behavioral reinforcement device is presented that includes a housing with an electronic display, where the electronic display displays a user's behavioral performance both numerically and symbolically. The housing includes a sensor to detect a user input and a token dispenser to dispense tokens. When the sensor detects a pre-defined user input, a controller executes a device activation sequence to turn the device on or a device deactivation sequence to turn the device off.

According to another embodiment, the behavioral reinforcement device includes a light feature that illuminates a predetermined positive color or a negative color to visually indicate the user's behavioral performance to provide behavioral reinforcement. In another embodiment, the behavioral reinforcement device includes a communications component that communicates with a wearable remote device where the wearable remote device includes an electronic display device, a sensor and a user interface.

In another embodiment of the present disclosure, there is provided a method for behavioral reinforcement. The method includes using a behavioral reinforcement device to reinforce positive behavioral performance of a user by placing the behavioral reinforcement device into an active state based on user input. Upon placing the behavioral reinforcement device in an active state a persona is positively displayed on the behavioral reinforcement device, a positive sound is generated by the behavioral reinforcement device, e.g., by a sound generator, and a timer begins recording positive time earned by the user. Further, when the timer reaches a preprogrammed milestone the persona reacts positively, a positive sound is generated by the behavioral reinforcement device, and a token is produced by the behavioral reinforcement device to the user.

In an embodiment of the present disclosure, a method further includes, if the user displays negative behavior, the user is instructed to deactivate the behavioral reinforcement device where the user flips the behavioral reinforcement device upside down. The method continues where the persona in the behavioral reinforcement device reacts negatively, a negative sound is generated by the behavioral reinforcement device, and the timer stops recording positive time earned by the user. In another embodiment of the present disclosure, a method further includes communicating wirelessly with a wearable remote device.

Further features and advantages of the present disclosure, as well as the structure and operation of various embodiments of the present disclosure, are described in detail below with reference to the accompanying drawings. It is noted that the present invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the present invention and to enable a person skilled in the relevant art(s) to make and use the present invention.

Additionally, the left-most digit of a reference number identifies the drawing in which the reference number first appears (e.g., a reference number '310' indicates that the element so numbered is first labeled or first appears in FIG. 3). Additionally, elements which have the same reference number, followed by a different letter of the alphabet or other distinctive marking (e.g., an apostrophe), indicate elements which are the same in structure, operation, or form but may be identified as being in different locations in space or recurring at different points in time (e.g., reference numbers '110a' and '110b' may indicate two different physical components devices which are functionally the same, but are located at different points in a device).

FIGS. 18A and 18B depict a front and side view of a wearable remote control device for a behavioral reinforcement device, according to an embodiment of the present disclosure.

FIG. 19 depicts communications between a wearable remote control device and a behavioral reinforcement device, according to an embodiment of the present disclosure.

Figure 1:
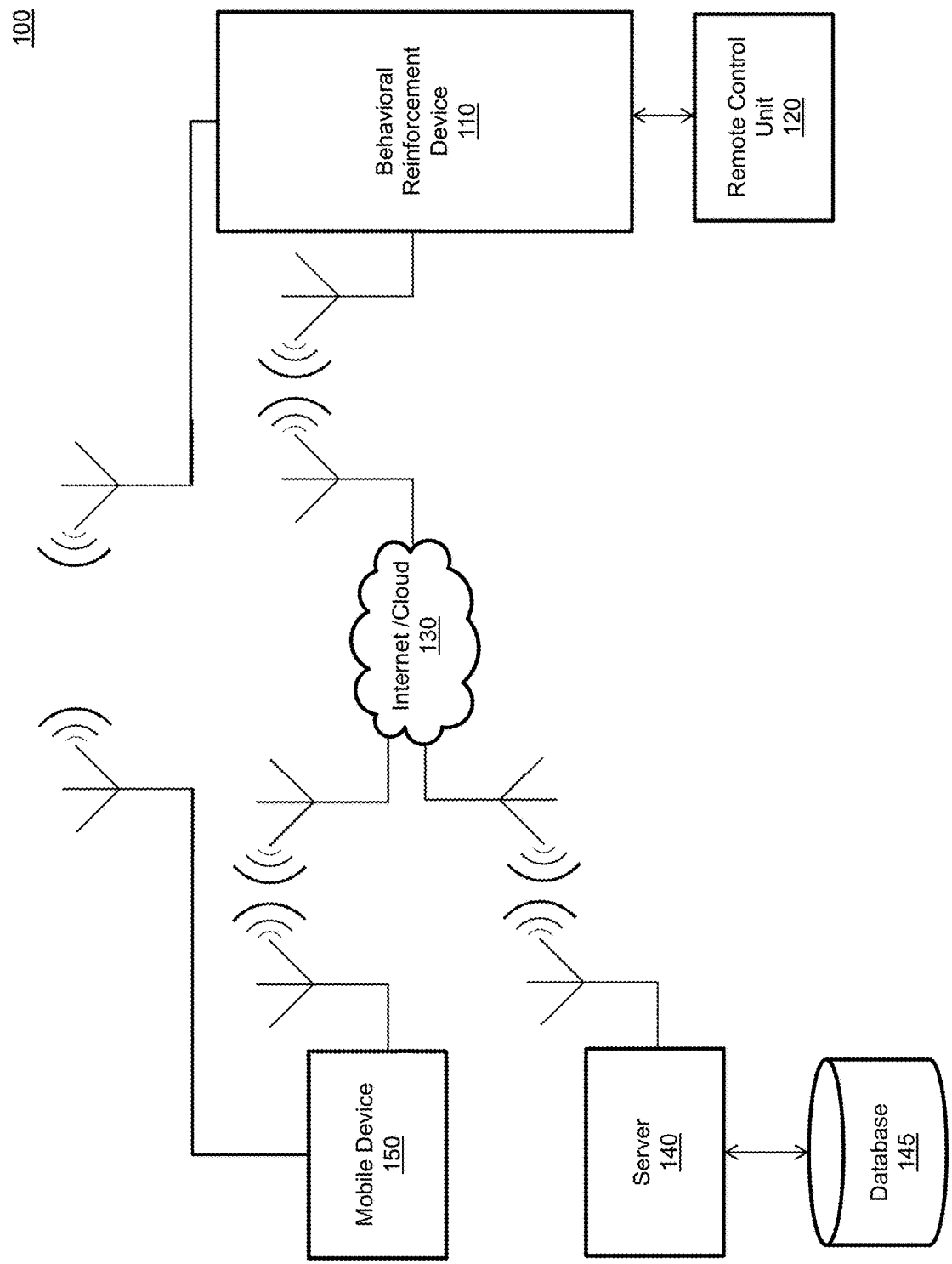
FIG. 1 illustrates a block diagram of a system including a behavioral reinforcement device, the Internet and a server, according to an embodiment of the present disclosure.

Further embodiments, features, and advantages of the present invention, as well as the operation of the various embodiments of the present invention, are described below with reference to the accompanying figures.

DETAILED DESCRIPTION OF THE INVENTION

While embodiments described herein are illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

The embodiments described herein are referred in the specification as "one embodiment," "an embodiment," "an example embodiment," etc. These references indicate that the embodiment(s) described can include a particular feature, structure, or characteristic, but every embodiment does not necessarily include every described feature, structure, or characteristic. Further, when a particular feature, structure, or characteristic is described in connection with an embodiment, it is understood that it is within the knowledge of one skilled in the art to affect such feature, structure, or characteristic in connection with other embodiments whether or not explicitly described.

The present invention can be deployed as a consumer electronic device that utilizes the psychological principal of positive reinforcement to encourage improvement in the behavior of children. In contrast to negative reinforcement methods, the behavioral reinforcement device includes a timer and internal memory to track and record the amount of time the child is meeting the desired behaviors set forth by their caregivers.

When a child exhibits the pre-determined desired behaviors, the device may be switched to "Good Time" simply by flipping over, or inverting, the device to "right side up." The device's hardware and software automatically recognize the user input or that the device has been flipped and the device begins to track the amount of good time the child is earning using a timer similar to a stopwatch. This method of activation is preferred so that it can be performed by children as young as three years old. Good time may also be activated, measured and recorded by pressing a button or other switch mechanism on the device, through voice commands, remotely by an external device such as a wearable remote control, or by another user input such as radio frequency identification ("RFID").

The behavioral reinforcement device may include a light feature that illuminates a pre-determined positive color, e.g., green or blue, or negative color, e.g., red, black or dark orange, to visually indicate the child is or is not earning good time, further providing positive reinforcement for the desired behavior. Rather than using a negative color the behavioral reinforcement device can also be configured to only display positive colors and remain neutral for any negative behavior. Additionally, the behavioral reinforcement device may include a speaker that may play a positive or negative sound, melodies and/or voices to further reinforce the child is earning good time. The device may include a display(s) that visually indicates the amount of good time earned both numerically and symbolically so children who are too young or unable to read or tell time can understand. The behavioral reinforcement device also may include a vibration or other type of haptic feature that can be activated to further indicate the performance of the child.

When a child meets pre-programmed or customer-selected good time milestones, e.g., the amount of good time achieved in a day, week or month, the behavioral reinforcement device may award tokens. These tokens may be earned by the child and can be saved and exchanged for additional incentives pre-determined by caregivers. The tokens will not only serve as currency for additional incentives, they will also be awarded to indicate the child has reached preprogrammed "level-up" milestones. For example, a special token may be awarded for achieving 100 hours of good time in a week.

The tokens may be awarded in digital or physical formats. A digital token may be awarded by the behavioral reinforcement device's software and displayed on the device's display or other device displays, e.g., a wearable remote control or smart device. A physical token may be included or purchased separately in various shapes and materials including but not limited to: a coin shaped disk, a rectangular shaped playing card, an individual or roll-dispensed ticket and/or a three-dimensional charm, keepsake, or totem physically resembling a character, animal and symbol. The token may be constructed from, paper, plastic, wood, metal or other materials safe for consumer use.

A token may be dispensed individually or several at a time, manually or automatically, via a token dispenser. This token dispenser may be integrated as part of the behavioral reinforcement device, charging base or may be a separate structure from the device. If the token dispenser is part of the behavioral reinforcement device or charging base it may be permanently attached or removable by the user allowing the user to more easily reload tokens or clean and maintain the dispenser. The token dispenser may also include a reloadable cartridge to make it easier to reload the dispenser. The token dispenser can be designed to allow the dispenser to be used and reloaded easily by the user including a child three years or older. The token dispenser may also dispense one or multiple tokens automatically when a child meets pre-programmed behavior milestones. The token dispenser may also dispense tokens manually by the user simply physically removing the token from the dispenser or through a push-button or other mechanical interface or wirelessly by a remote device such as a smartphone or other electronic device. A light or LED may be included indicating the child has earned a token so the user knows when to remove a token from the dispenser.

The behavioral reinforcement device can also be configured to record the number of "flips" or inversions of the behavioral reinforcement device over any given period, e.g., hours, days, weeks, etc. In an alternative mode, the number of flips of the behavioral reinforcement device may be used to assess the performance of the child. For example, if the child has less than three flips in one 24-hour period, they may earn a token.

If a child exhibits an undesired behavior, the caregiver may instruct the child to flip the behavioral reinforcement device over, thus deactivating the accrual of good time, and stopping the timer. Good time may also be deactivated by pressing a button on the device or remotely using another device and/or remote control. Sensors within the behavioral reinforcement device automatically recognize the device has been flipped over and may simultaneously deactivate the good time light and play a negative sound indicating the child is no longer earning good time. A display on the behavioral reinforcement device can include numerical and graphical elements to also indicate the child is no longer earning good time.

The behavioral reinforcement device can also include a push button control system. The user may manually add or subtract good time using the push-button interface or a remote device. Further, the behavioral reinforcement device may be charged wirelessly through a charging station, e.g., dock, or directly through a charging cable and adaptor and can also include internal rechargeable batteries or disposable batteries. In an embodiment, the behavioral reinforcement device battery may be removable and/or replaceable. The behavioral reinforcement device may also include the functionality typically included in a digital clock, or watch including but not limited to the date, time, countdown timer, stopwatch and alarm.

The behavioral reinforcement device may include an origin story and persona designed to encourage the child to connect and engage with it. The origin story will include that the device has a personality and wants to help the child grow and succeed. As the child uses the device they may unlock graphics displayed on the product's display, new colors displayed by lights, and sounds played through the speakers further encouraging the child to engage with the product and improve their behavior. Additionally, the story may include stickers corresponding to level ups the child may earn as they achieve milestones. These stickers may be used to decorate the behavioral reinforcement device and may be applied to tokens to commemorate milestones that have been achieved by the child.

The behavioral reinforcement device may include communication capabilities, including antennas and/or a wired connection allowing the device to communicate with and/or be controlled remotely by a remote control or other electronic devices, e.g., computers, tablets, smartphones and via an application or web interface. Methods of communications can include Bluetooth, cellular, infra-red, radio frequency, or any other known method of transmission.

The behavioral reinforcement device may also work in conjunction with a remote or secondary device aimed to gather child performance data when they are away from the primary device. For example, the primary device may remain at home while the child travels to daycare or school for the day. During the day, the child would carry or wear the secondary device, which may include hardware, and software, which measures the amount of good time, or flips that occur throughout the day. The secondary device may include a visual display with color-coded lights corresponding to behavior performance, as well as text and/or graphics indicating the child's performance. The secondary device may also include a speaker and haptic features that play sounds and vibrates to indicate the child's performance. The secondary device may include antennas and/or a wired connection to sync with the primary device. The secondary device may be a wearable device similar to a smart watch or wearable health monitor.

In an embodiment, the behavioral reinforcement device can track the behavior performance of multiple users, e.g., the case of a family with multiple children. The behavioral reinforcement device would include a display that has multiple areas designated for each child who can be viewed and controlled by the control interface. Also, the behavioral reinforcement device lights may include multiple colors or multiple lighted regions corresponding to each child. Additionally, unique sounds including user-specific sounds may be activated to differentiate the performance of each child. Additionally, the primary device in the multi-child embodiment may receive input from multiple secondary data gathering devices.

The behavioral reinforcement device may also be water resistant and drop resistant withstanding the wear and tear you may expect it to encounter in an average household with young children. The behavioral reinforcement device may be lightweight and portable and may include an attachment mechanism, e.g., a carabineer or key chain, allowing the product to go with the family as they travel away from the home. A mute switch and on/off switch may also be included.

FIG. 1 illustrates a block diagram of a behavioral reinforcement system 100, according to an embodiment. Behavioral reinforcement system 100 includes behavioral reinforcement device 110, a remote control unit 120, an Internet and/or cloud system 130, a server 140, a database 145 and a mobile device 150.

Behavioral reinforcement device 110 utilizes the psychological principal of positive reinforcement to encourage improvement in the behavior of children and includes a timer and internal memory to track and record the amount of time the child is meeting the desired behaviors set forth by their caregivers, also referred to as "good time." Behavioral reinforcement device 110 can communicate with other devices including server 140, remote control unit 120 and mobile device 150. Such communications can be wired, but typically are wireless and can utilize any known communication protocol, e.g., Wi-Fi, Bluetooth, cellular, infra-red, radio frequency, etc.

For example, remote control unit 120 can be a wearable device, worn by a child to collect and monitor behavioral information that is communicated back to behavioral reinforcement device 110. Remote control unit 120 can also be utilized to control functionality within behavioral reinforcement device 110, such as altering the amount of recorded "good time" for a particular child. In a similar manner, mobile device 150 can execute an application that can also control the functionality of behavioral reinforcement device 110 through directed communications such as Bluetooth or Wi-Fi, or through internet and/or cloud system 130.

Information from behavior reinforcement device 110 can be accessed by server 140 and stored on database 145. In an embodiment, there are multiple behavioral reinforcement devices 110 that can all store behavioral or operation data utilizing server 140 and database 145. Such a situation could exist in a classroom situation with multiple children and multiple behavioral reinforcement devices 110, or with a behavioral reinforcement device 110 designed to accommodate multiple users.

Figure 2:
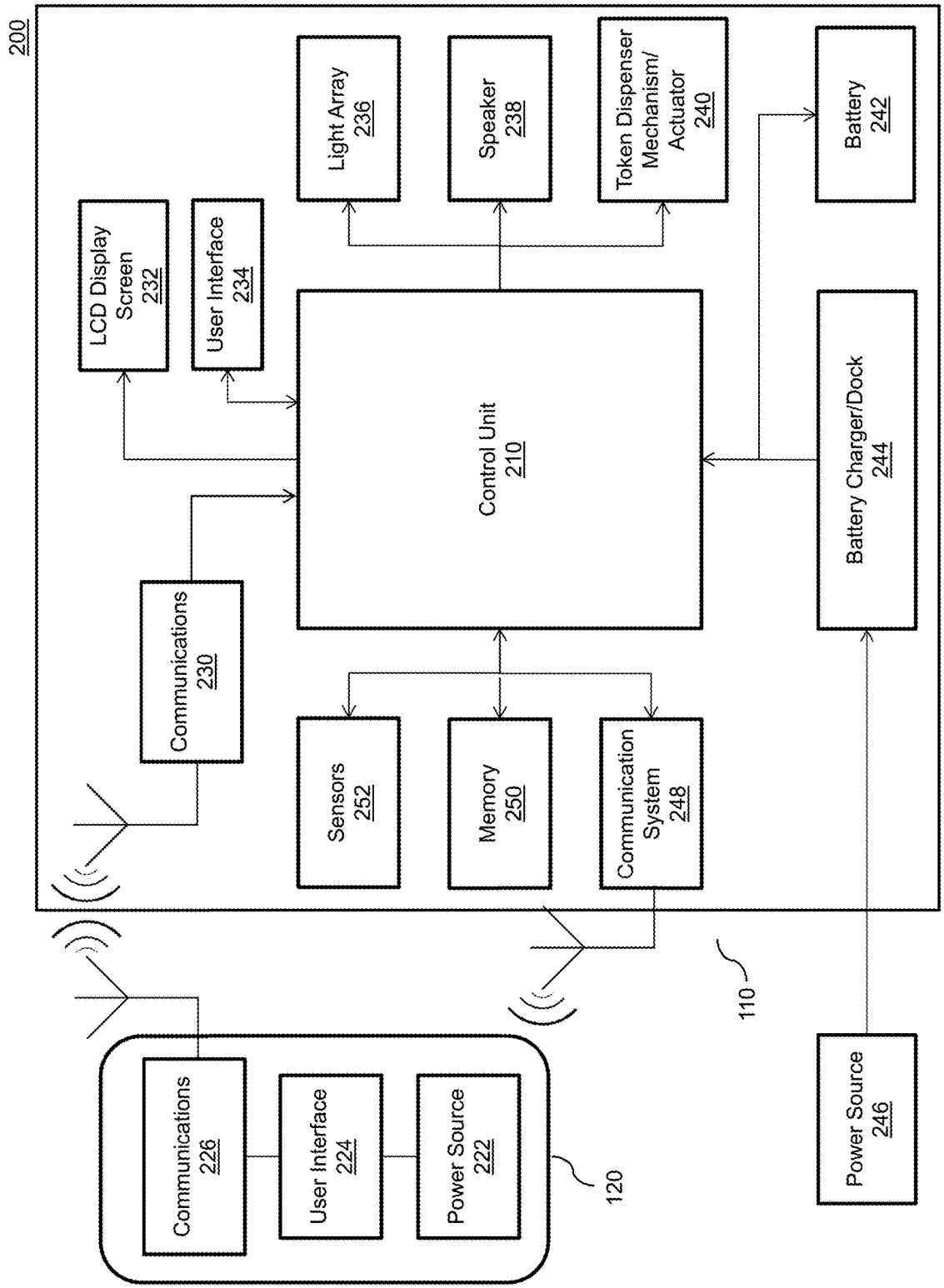
FIG. 2 depicts a detail block diagram of a behavioral reinforcement device and a remote user interface, according to an embodiment of the present disclosure.

FIG. 2 depicts a more detailed block diagram of a behavioral reinforcement system 200. Behavioral reinforcement system 200 includes behavior reinforcement device 110 and remote control unit 120 from FIG. 1 and also shows a power source 246 coupled to behavior reinforcement device 110.

Behavior reinforcement device 110 includes a control unit 210, a communication system 230, a (liquid crystal display) LCD display screen 232, a user interface 234, a light array 236, a speaker 238, a token dispenser mechanism/actuator 240, a battery 242, a battery charger/dock 244, a communications system 248, a memory 250 and a sensor 252. Remote control unit 120 includes a power source 222, a user interface 224 and a communications system 226.

Control unit 210 is powered by battery 242, which is internal. Battery 242 can be charged through battery charger/dock 244 that is coupled to the main body of behavior reinforcement device 110 and obtains its power from power source 246. In an embodiment, behavior reinforcement device 110 does not utilize a battery charger/dock, but obtains its power directly from power source 246.

Control unit 210 includes a processor that stores information in memory 250 and also executes instructions stored in memory 250. Control unit 210 can accept input from a user through user interface 234 and can convey behavioral and operational information to a user through LCD display screen 232. Light array 236 and speaker 238 are used to deliver feedback to a child based on the child's behavior where positive colors, e.g., green and blue, are illuminated and positive sounds, e.g., words of praise, clapping, happy noises, can be generated and heard by the child. Token dispenser mechanism/actuator 240, also controlled by control unit 210, and is designed to dispense tokens as a reward for positive behavior. In an embodiment, token dispenser mechanism/actuator 240 dispenses virtual tokens and therefore can take the form of electronics that could use communication system 230 to deliver a virtual token to an electronic device, such as remote control unit 120 through communication system 226. Alternatively, token dispenser mechanism/actuator 240 can deliver the virtual token utilizing communications system 248 to a mobile device, tablet, smartphone, etc., using Wi-Fi, cellular, near-field communications or other similar method of electronic communication.

Remote control unit 120 utilizes its own internal power source 222 that could be an internal or removable battery, rechargeable or replaceable. Remote control unit 120 also includes user interface 224 that allows for interaction with a user.

Figure 3:
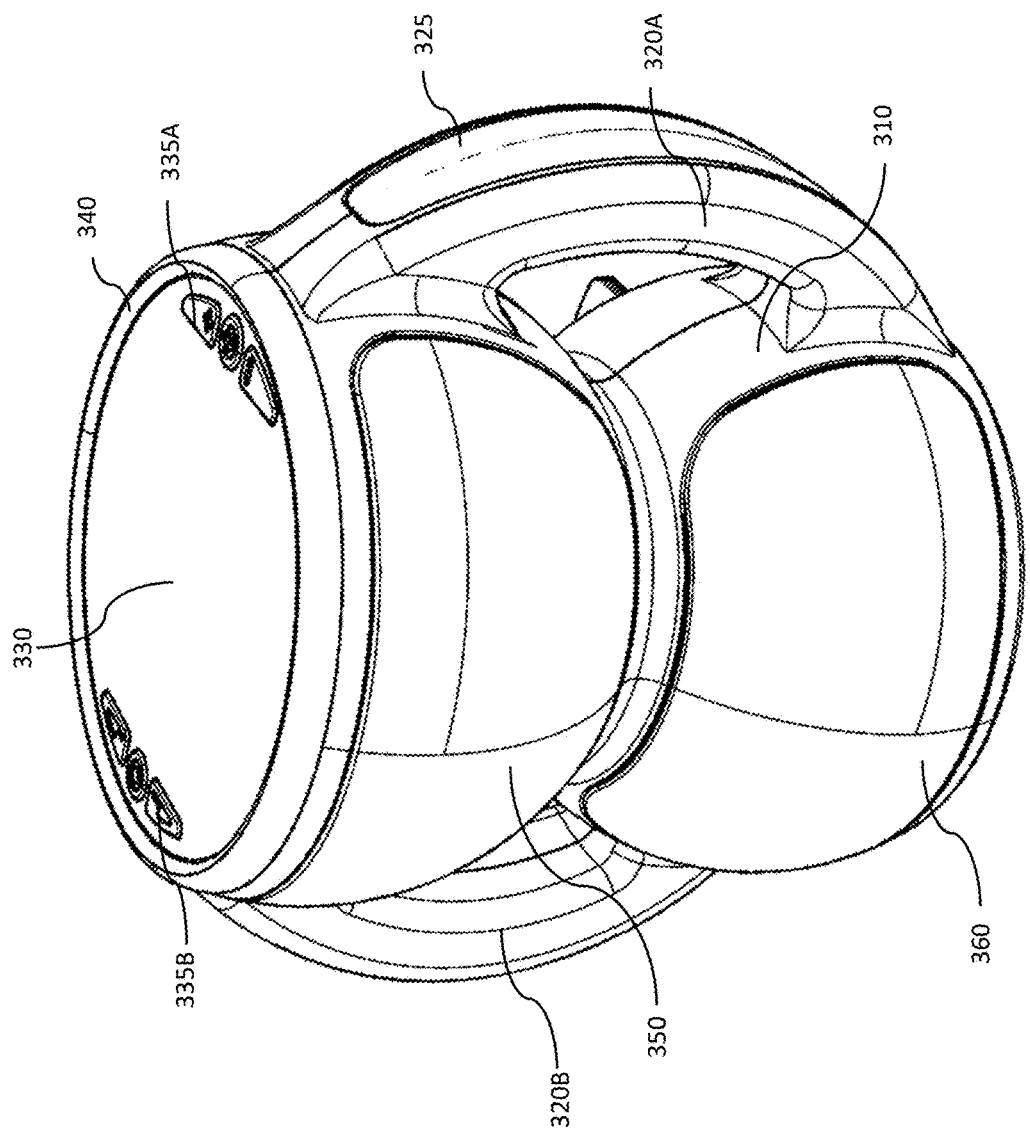
FIG. 3 depicts a possible configuration for a behavioral reinforcement device, according to an embodiment of the present disclosure.

FIG. 3 illustrates an angled front view of a behavioral reinforcement device 300, according to an embodiment. Behavioral reinforcement device 300 includes a body 310, handles 320A and 320B that can be integrated into body 310, recessed area 325, a display 330, buttons 335A and 335B, a bumper 340, a light cover 350 and a speaker cover 360. In an embodiment, body 310 is an hour-glass body shape that includes handles 320A and 320B, which allows a child to easily grasp and manipulate behavioral reinforcement device 300. However, in another embodiment, body 310 can take many different forms, including that of a cylinder with no handles, but where the cylinder is of a small enough diameter to be grasped and manipulate by a child. Or, in the alternative the cylinder could include one or more handles situated vertically, horizontally or as a combination of both. Body 310 can also be referred to as a housing, where the housing can take the form of any cylindrical shape.

Body 310 provides a structure to behavioral reinforcement device 300 and protects the internal electrical components. Body 310 can be constructed from any appropriate material include injection-molded plastics but could also be constructed using formed or machined metal, wood, foam or other material components. Body 310 can also consist of multiple parts assembled using screws, snap features, latches, adhesive or other assembly methods.

In an embodiment, body 310 includes handles 320A and 320B that allow behavioral reinforcement device 300 to be easily controlled and carried by the user. Handles 320A and 320B can be incorporated into body 310 components but may also be separate parts attached during assembly. Handles 320A and 320B can also include grips and tethers (not shown) that may also be incorporated making behavioral reinforcement device 300 easier to handle and carry.

In an embodiment, body 310 includes a recessed area 325 for the application of decorative stickers that may be applied to body 310 to commemorate the successful completion of key performance milestones achieved by the user. Stickers may be used to decorate behavioral reinforcement device 300 and may be applied to tokens to commemorate milestones that have been achieved by the user.

Display 330 is an electronic display incorporated into body 310. In an embodiment, display 330 is placed into the top exterior surface of body 310 that visually indicates the performance of the user and other device information both numerically and symbolically. Display 330 may utilize a liquid crystal display (LCD), light emitting diode (LED), e-ink or other electronic display technology. Display 330 can be incorporated into any location of body 310, further multiple display 330s may also be used to display additional information or for multiple users as will be discussed.

In an embodiment, buttons 335A and 335B are incorporated into body 310, or also into the surface of display 330 and are used to control the functionality of behavioral reinforcement device 300. Behavioral reinforcement device 300 may also include a touch-sensitive control interface, switches or other control interfaces to control the functionality of behavioral reinforcement device 300.

In an embodiment, bumper 340 is incorporated into the top surface of the exterior of body 310 that provides protection to display 330, buttons 335 and/or other features. Behavioral reinforcement device 300 may also include bumpers on the bottom and sides to provide additional protection. Bumper 340 can be constructed from injection or compression molded materials, or from any other process using other shock-absorbing materials.

In an embodiment, light cover 350 covers a light feature (not shown, but see FIG. 13) located inside body 310 that illuminates a pre-determined positive color, e.g., green or blue, or the lack of color, e.g., no light, or even a negative color, e.g., red, black or dark orange, when activated to visually indicate the user's behavioral performance providing reinforcement for a particular behavior. Lights can be made from high-intensity LEDs and could include a reflector and dome components constructed from metal and/or plastic to disperse/distribute the light source. Additional lights may also be incorporated into the exterior surface of body 310.

Behavioral reinforcement device 300 can include one or more light cover 350s that can be incorporated into the exterior surface of body 310 that allows the light component inside body 310 to be seen from the exterior of body 310 when the light is activated. Light cover 350 can be constructed from translucent injection-molded plastic components, but may also be constructed using formed or glass or other translucent or transparent materials. In another embodiment, the integrated light and light cover 350 can be replaced with a light panel, e.g., a LED light panel.

In an embodiment, speaker cover 360 covers a speaker (not shown) that plays positive or negative sounds, songs, voices or other audio to further reinforce the user's performance. The speaker is controlled by software saved to a control unit incorporated into a controller mounted within body 310 and plays sound files stored in memory.

Speaker cover 360 is incorporated into the exterior surface of body 310 and provides protection for the speaker while allowing sound produced by the speaker to be heard by the user. Speaker cover 360 can be constructed from injection-molded plastic components but may also be constructed using formed or machined material, including but not limited to metal, wood, foam or other material components. Speaker cover 360 may also be perforated and may be covered in a fabric or other material that accommodates sound propagation.

Figure 4:
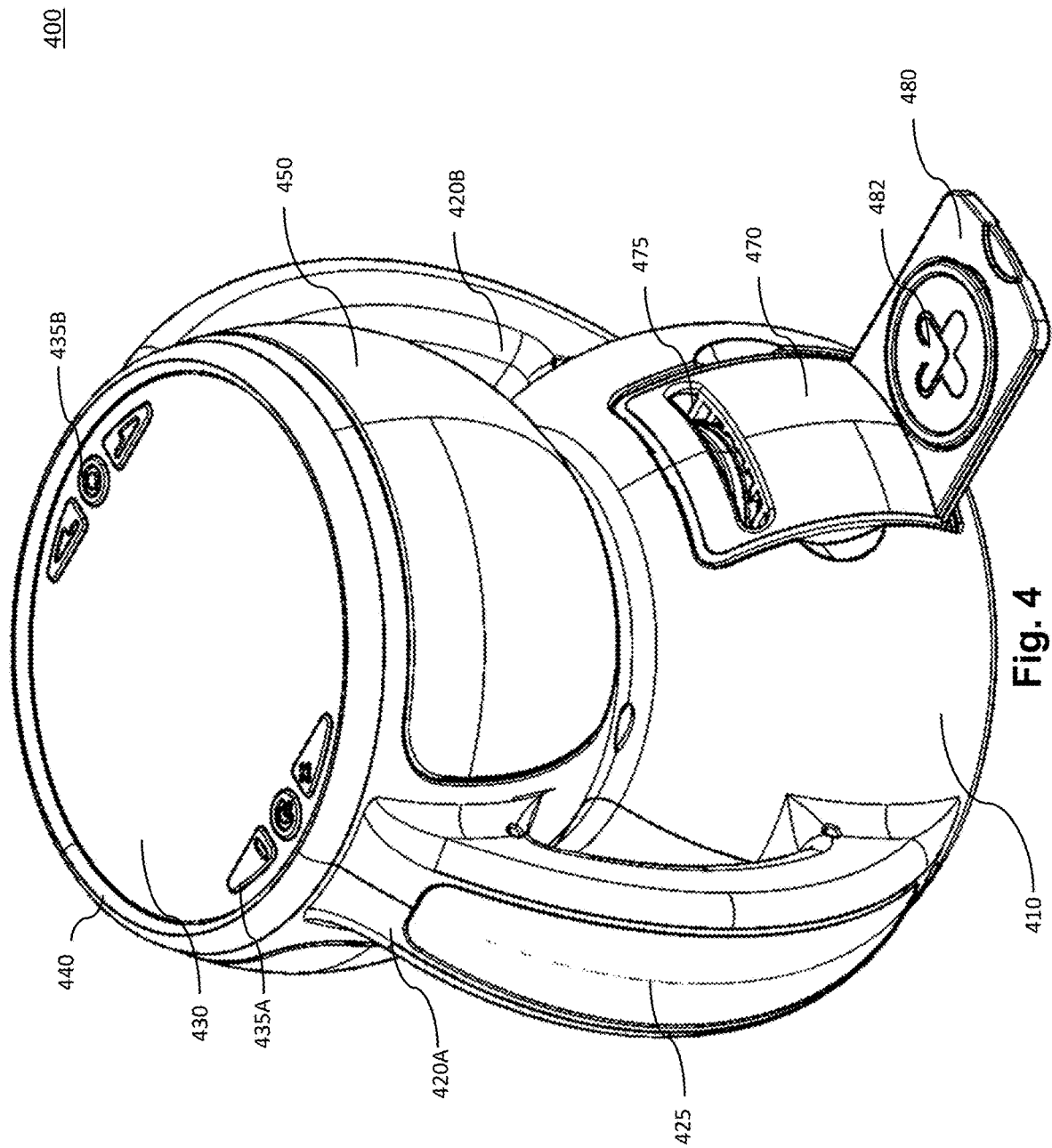
FIG. 4 depicts a possible configuration for a behavioral reinforcement device that includes a token dispenser, according to an embodiment of the present disclosure.

FIG. 4 illustrates an angled rear view of a behavioral reinforcement device 400, according to an embodiment. Behavioral reinforcement device 400 includes a body 410, integrated handles 420A and 420B, recessed area 425, a display 430, buttons 435A and 435B, a bumper 440 and a light cover 450. The descriptions in FIG. 3 of body 310, handles 320A and 320B, recessed area 325, display 330, buttons 335A and 335B, bumper 340, light cover 350 and speaker cover 360 are applicable to their counterpart elements in FIG. 4.

Behavioral reinforcement device 400 also includes a token dispenser 470, a load opening 475, a token tray 480 and a token 482. Behavioral reinforcement device 400 includes the use of tokens, such as token 482, that are awarded to the user to encourage and reinforce positive behaviors. Tokens can exist in a physical format, such as token 482, but can also exist in a virtual, or digital, format. A digital token can be awarded by behavioral reinforcement device 400 and presented to the user on display 430, or any other electronic device, such as a smart phone. Physical tokens, such as token 482, can be included with behavioral reinforcement device 400 and can take any shape, including that of a coin, a playing card, an individual or roll-dispensed ticket, a three-dimensional charm, keepsake, or totem physically resembling a character, animal or symbol. Token 482 can be constructed from plastic, metal, paper, wood or any other materials safe for consumer use.

In an embodiment, token dispenser 470 is incorporated into body 410. Token dispenser 470 may also be a separate structure from body 410 and may be removable from body 410 allowing the user to more easily reload tokens or clean and maintain the token dispenser 470. Token dispenser 470 may dispense one or multiple tokens automatically when the user meets pre-programmed performance milestones. Token dispenser 470 may also dispense tokens manually by the user physically removing the token from the dispenser or through a push-button or other mechanical interface. Token dispenser 470 can be constructed from injection-molded plastic components but may also be constructed using formed or machined metal, wood, foam or other material components.

Token dispenser 470 also includes a token reservoir that can store multiple tokens. Token dispenser 470 may also include a reloadable cartridge (not shown) to make it easier to reload the dispenser. Token dispenser 470 is designed to allow it to be used and reloaded easily by the user. The token reservoir may include a spring-loaded mechanism to improve the performance of loading and/or removing the tokens. The token reservoir can be constructed from injection-molded plastic components but may also be constructed using formed or machines metal, wood, foam or other material components.

In an embodiment, load opening 475 allows a user to easily insert or remove one or more of token 482. Token tray 480 may be included within body 410 allowing the user to load or remove tokens from token dispenser 470 once a token is earned. Further, in an embodiment, body 410 may include a token light that indicates the user has earned a token so that the user knows when to remove token 482 from token dispenser 470.

Figure 5:
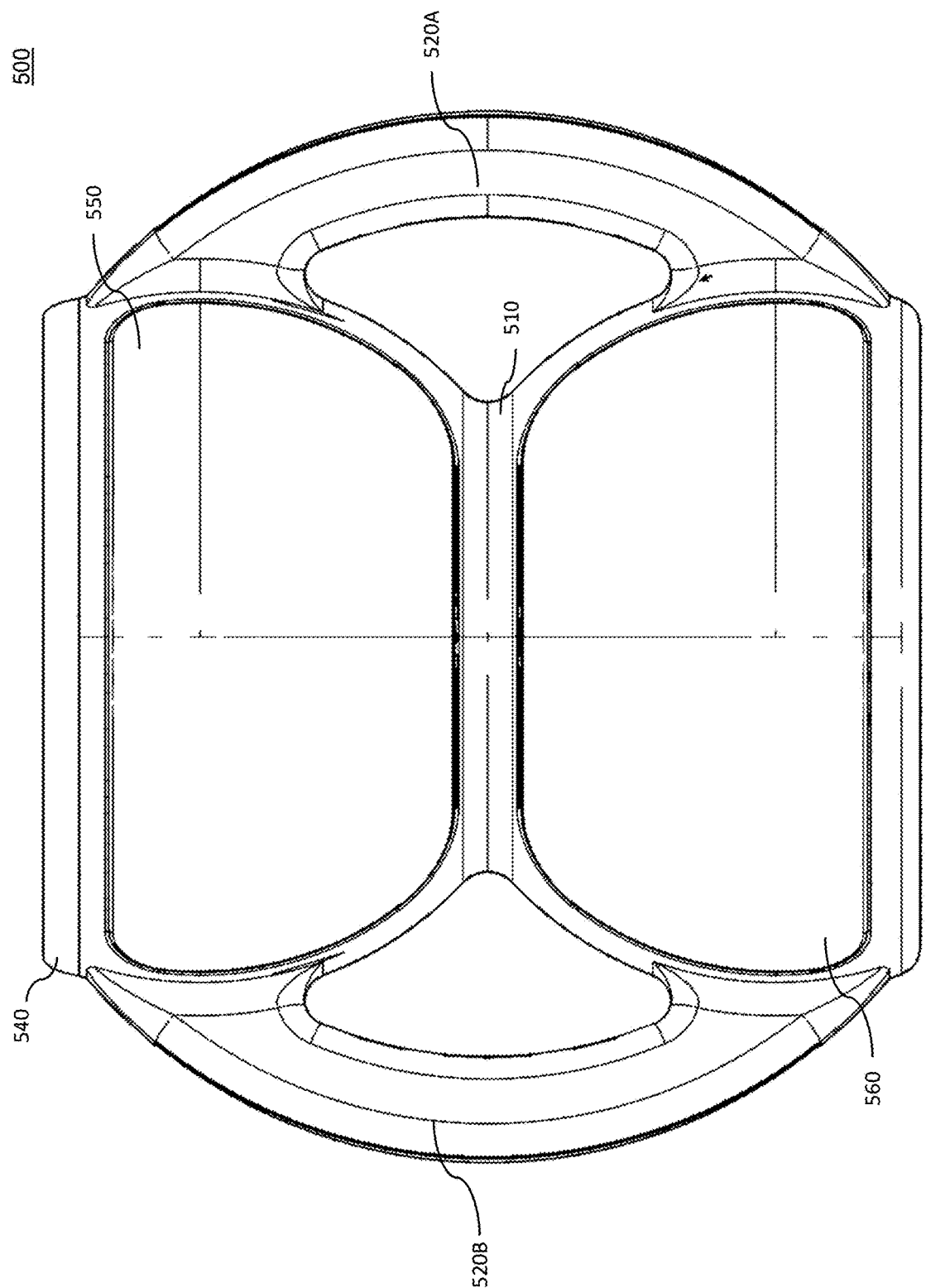
FIG. 5 depicts a front view of a possible configuration for a behavioral reinforcement device, according to an embodiment of the present disclosure.

FIG. 5 illustrates a front view of a behavioral reinforcement device 500, according to an embodiment. Behavioral reinforcement device 500 includes a body 510, integrated handles 520A and 520B, a bumper 540, a light cover 550 and a speaker cover 560. The descriptions in FIG. 3 of body 310, integrated handles 320A and 320B, bumper 340, light cover 350 and speaker cover 360 are applicable to their counterpart elements in FIG. 5.

Figure 6:
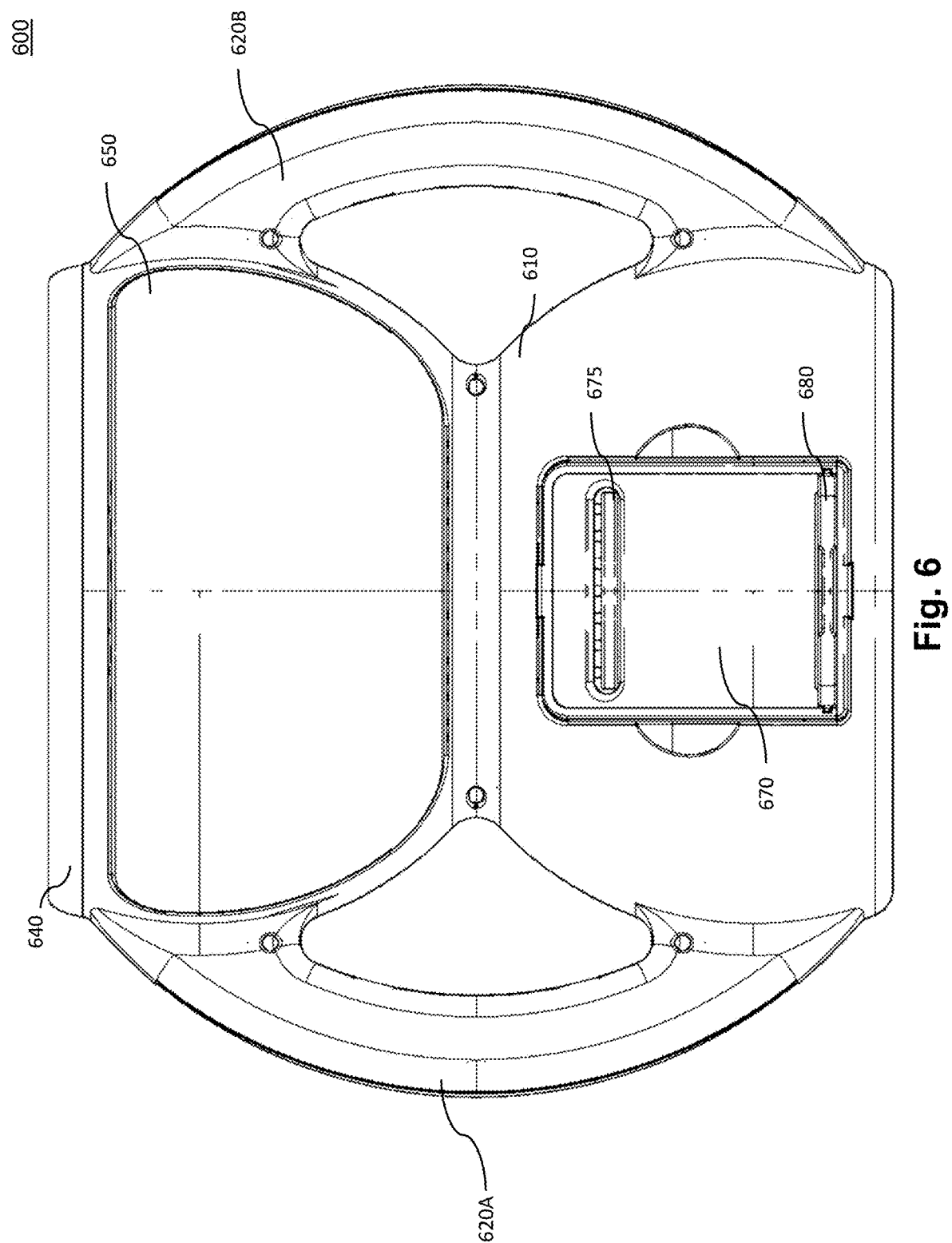
FIG. 6 depicts a back view of a possible configuration for a behavioral reinforcement device, according to an embodiment of the present disclosure.

FIG. 6 illustrates a rear view of a behavioral reinforcement device 600, according to an embodiment. Behavioral reinforcement device 600 includes a body 610, integrated handles 620A and 620B, a bumper 640, a light cover 650, a token dispenser 670, a load opening 675 and a token tray 680. The descriptions in FIG. 3 of body 310, integrated handles 320A and 320B, bumper 340 and speaker cover 360 are applicable to their counterpart elements in FIG. 6. The descriptions in FIG. 4 of token dispenser 470, load opening 475 and token tray 480 are applicable to their counterpart elements in FIG. 6.

Figure 7:
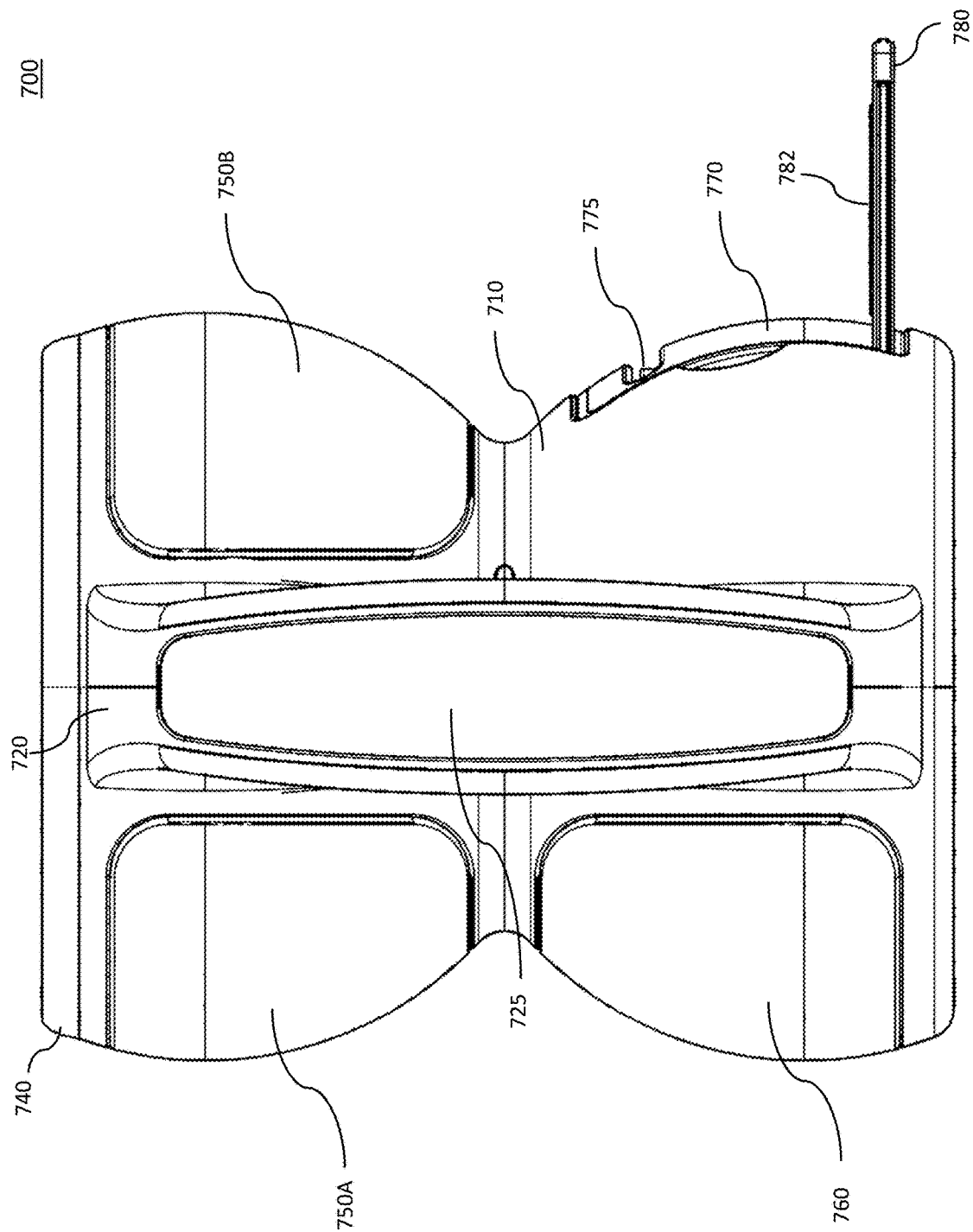
FIG. 7 depicts a right side view of a possible configuration for a behavioral reinforcement device, according to an embodiment of the present disclosure.

FIG. 7 illustrates a right side view of a behavioral reinforcement device 700, according to an embodiment. Behavioral reinforcement device 700 includes a body 710, an integrated handle 720, a recess area 725, a bumper 740, light covers 750A and 750B, a speaker cover 760, a token dispenser 770, a load opening 775, a token tray 780 and a token 782. The descriptions in FIG. 3 of body 310, integrated handle 320, recessed area 325, bumper 340, light cover 350 and speaker cover 360 are applicable to their counterpart elements in FIG. 7. The descriptions in FIG. 4 of token dispenser 470, load opening 475, token tray 480 and token 482 are applicable to their counterpart elements in FIG. 7.

Figure 8:
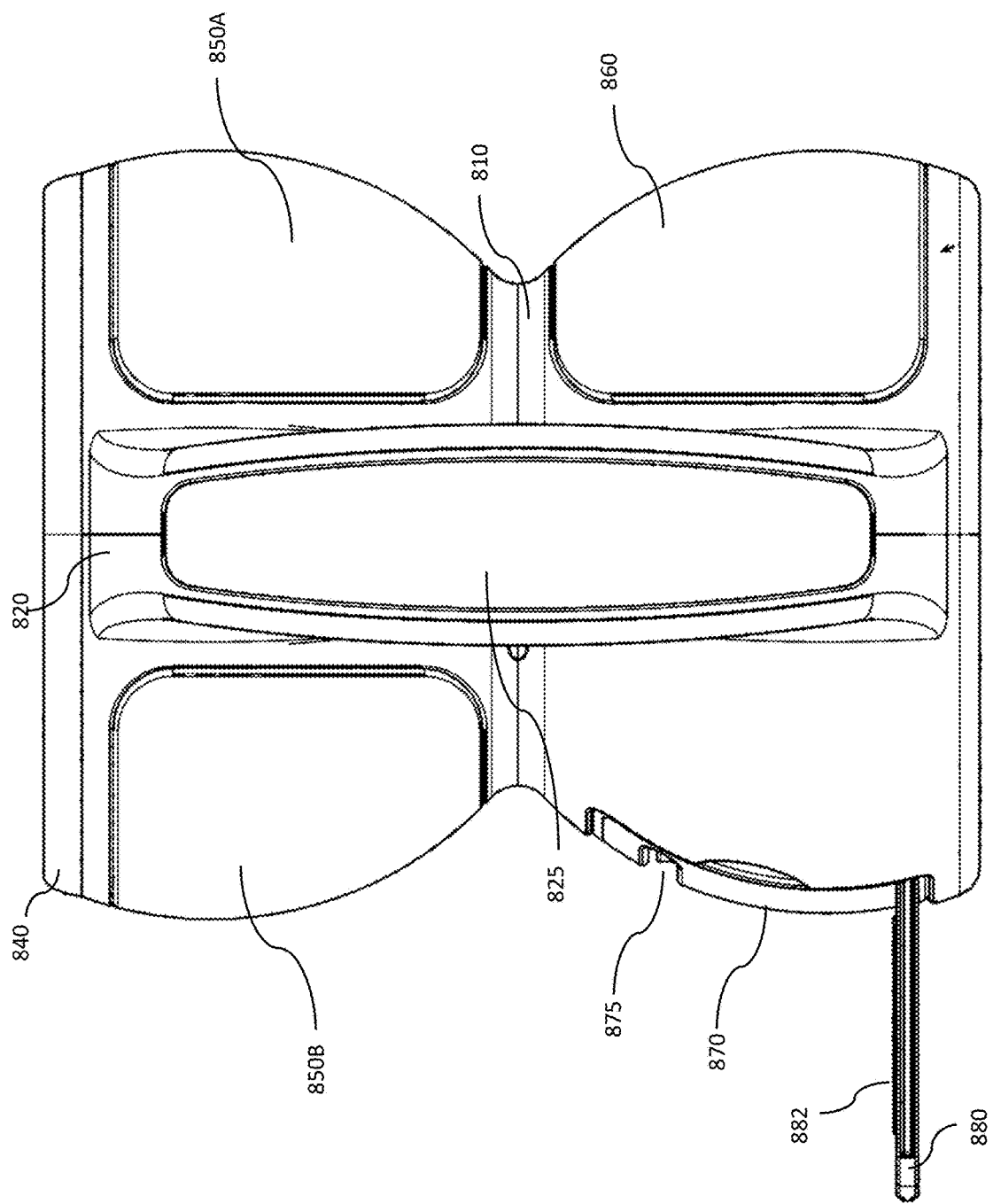
FIG. 8 depicts a left side view of a possible configuration for a behavioral reinforcement device, according to an embodiment of the present disclosure.

FIG. 8 illustrates a left side view of a behavioral reinforcement device 800, according to an embodiment. Behavioral reinforcement device 800 includes a body 810, an integrated handle 820, a recess area 825, a bumper 840, light covers 850A and 850B, a speaker cover 860, a token dispenser 870, a load opening 875, a token tray 880 and a token 882. The descriptions in FIG. 3 of body 310, integrated handle 320, recessed area 325, bumper 340, light cover 350 and speaker cover 360 are applicable to their counterpart elements in FIG. 8. The descriptions in FIG. 4 of token dispenser 470, load opening 475, token tray 480 and token 482 are applicable to their counterpart elements in FIG. 8.

Figure 9:
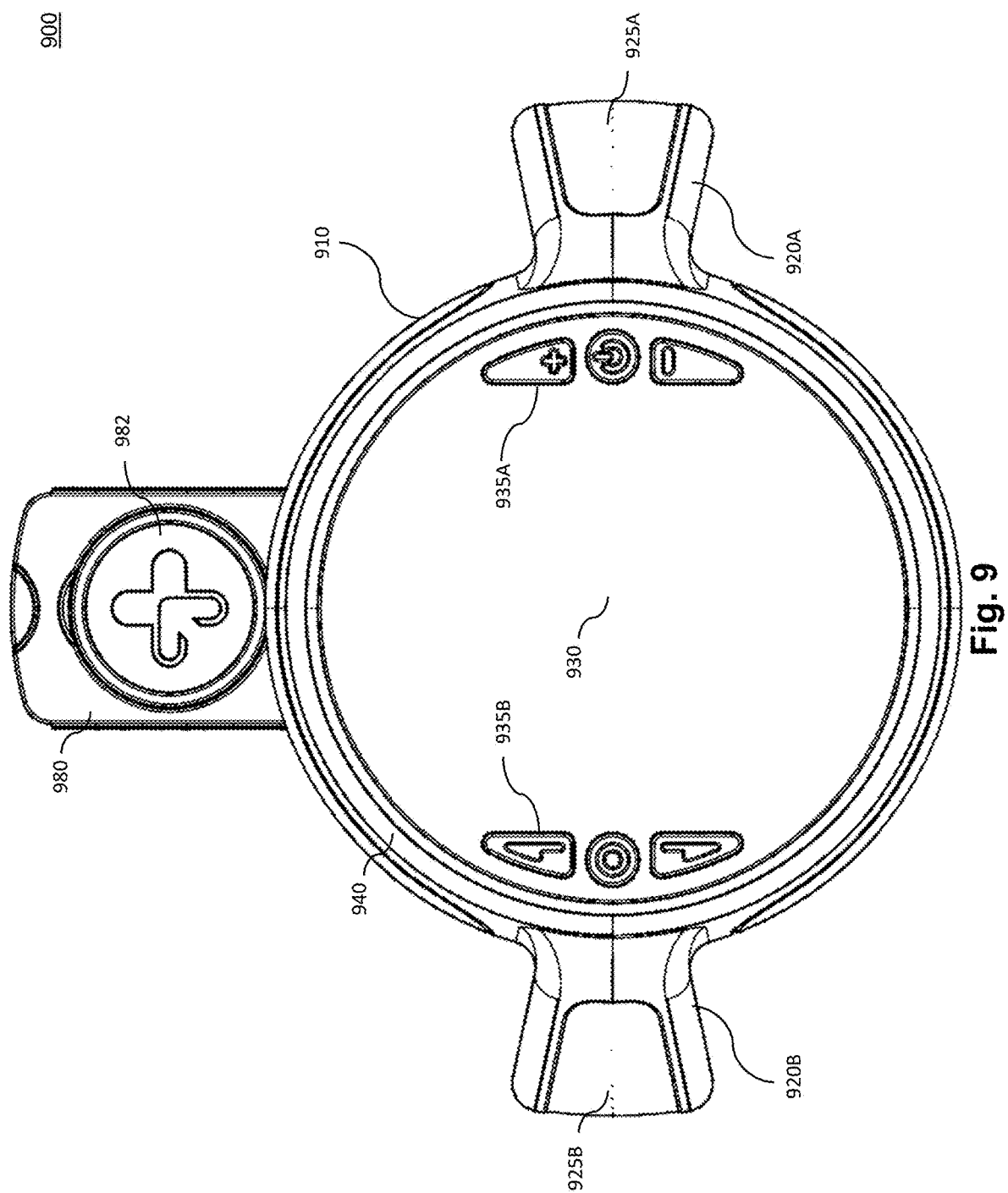
FIG. 9 depicts a top view of a possible configuration for a behavioral reinforcement device, according to an embodiment of the present disclosure.

FIG. 9 illustrates a top view of a behavioral reinforcement device 900, according to an embodiment. Behavioral reinforcement device 900 includes body 910, integrated handles 920A and 920B, a recessed areas 925A and 925B, display 930, buttons 935A and 935B, a bumper 940, a token tray 980 and a token 982. The descriptions in FIG. 3 of body 310, integrated handles 320A and 320B, recessed area 325, buttons 335A and 335B and bumper 340 are applicable to their counterpart elements in FIG. 9. The descriptions in FIG. 4 of token tray 480 and token 482 are applicable to their counterpart elements in FIG. 9.

Figure 10:
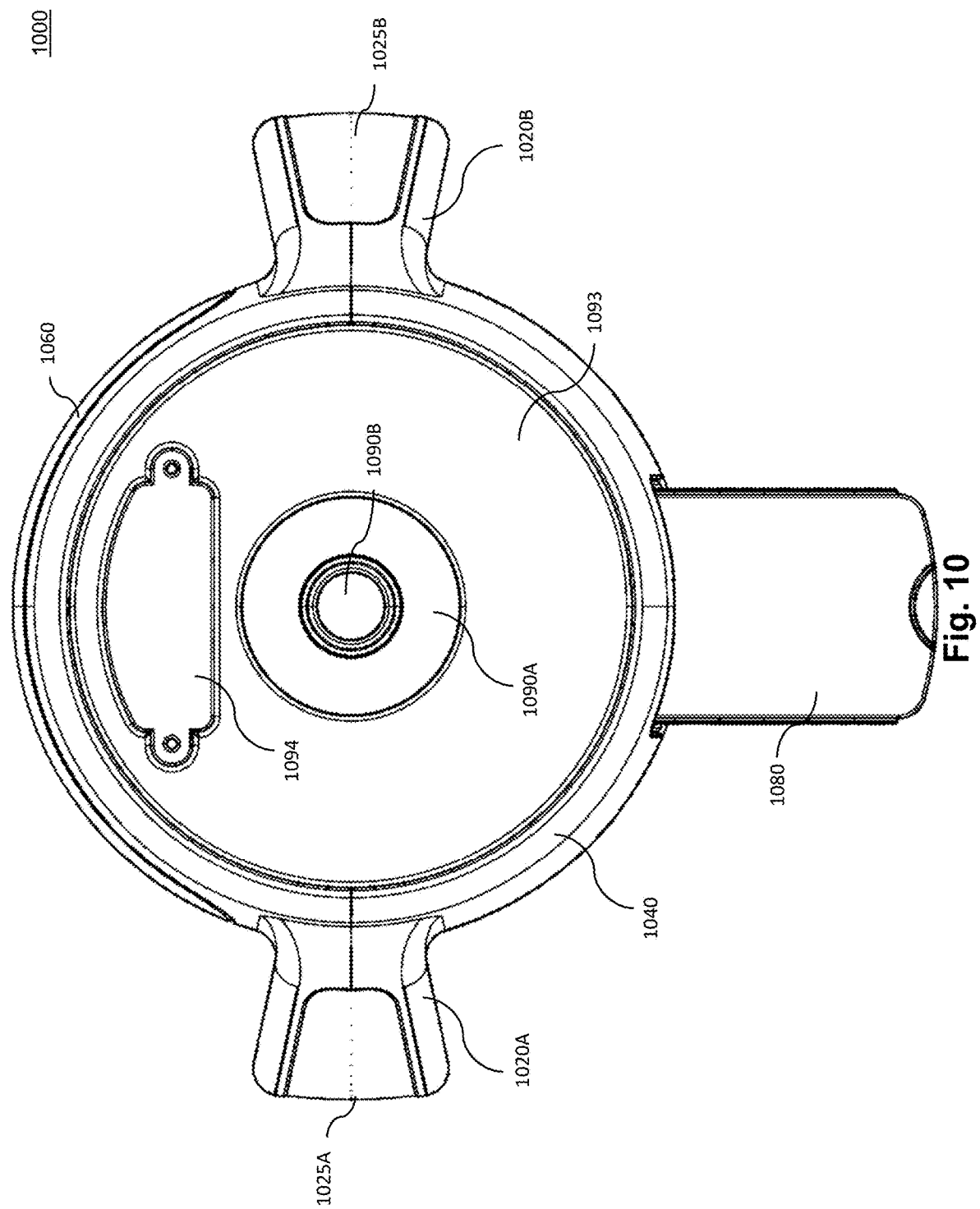
FIG. 10 depicts a bottom view of a possible configuration for a behavioral reinforcement device, according to an embodiment of the present disclosure.

FIG. 10 illustrates a bottom view of a behavioral reinforcement device 1000, according to an embodiment. Behavioral reinforcement device 1000 includes integrated handles 1020A and 1020B, recessed areas 1025A and 1025B, a speaker cover 1060 and a token tray 1080. The descriptions in FIG. 3 of integrated handles 320A and 320B, and recessed area 325 are applicable to their counterpart elements in FIG. 10. The description in FIG. 4 of token tray 480 is applicable to its counterpart element in FIG. 10. Behavioral reinforcement device 1000 also includes charging contacts 1090A and 1090B, base 1093 and battery cover 1094.

Battery cover 1094 allows access to one or more internal batteries that provide power to the device. The battery may be removable, rechargeable and/or replaceable. In another embodiment, the battery may be permanent and the battery cover 1094 may be eliminated. Charging contacts 1090A and 1090B provide a connection point to charge behavioral reinforcement device 1000 through a charging dock that would include conductive charging contact that correspond to the charging dock such that when behavioral reinforcement device 1000 is placed on the dock in any orientation the batteries inside behavioral reinforcement device 1000 are charged automatically. In another embodiment, behavioral reinforcement device 1000 can be charged wirelessly through inductive or other wireless charging technologies that may be used to achieve charging.

Figure 11:
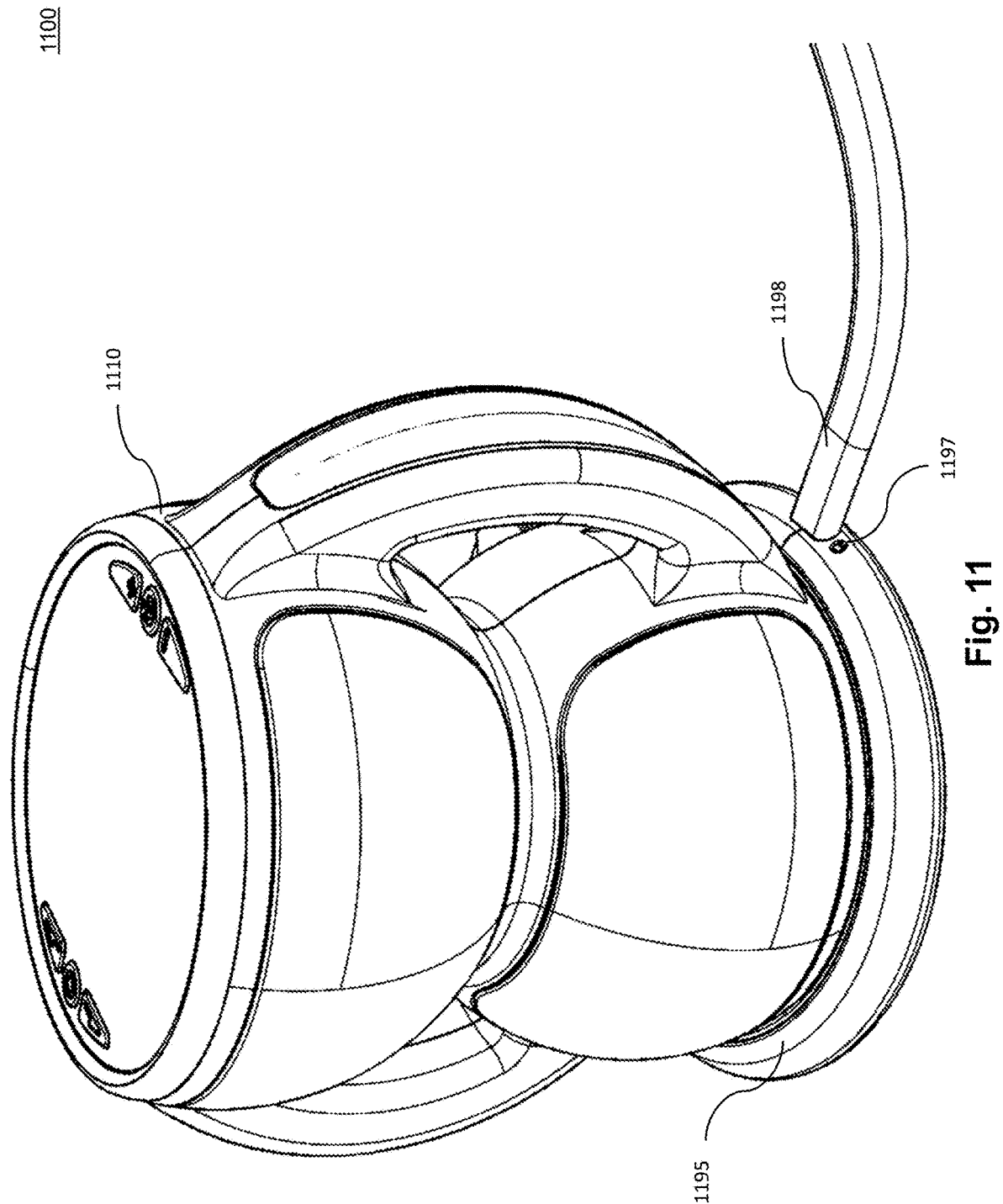
FIG. 11 depicts a possible configuration for a behavioral reinforcement device in a charging base, according to an embodiment of the present disclosure.

FIG. 11 illustrates a behavioral reinforcement system 1100 that includes a charging base, according to an embodiment. Behavioral reinforcement system 1100 includes a body 1110 that is coupled to a dock 1195 that includes a charge indicator 1197 and a cable 1198. Dock 1195 supports body 1110 when placed on a table or other flat surface and incorporates components required for charging body 1110. Dock 1195 also includes a cable 1198 that functions as a charging cable that connects to a power source such as a wall outlet, car outlet or external battery. Dock 1195 also includes charge indicator 1197 that indicates the charging status of the dock and/or behavioral reinforcement system 1100.

Figure 12:
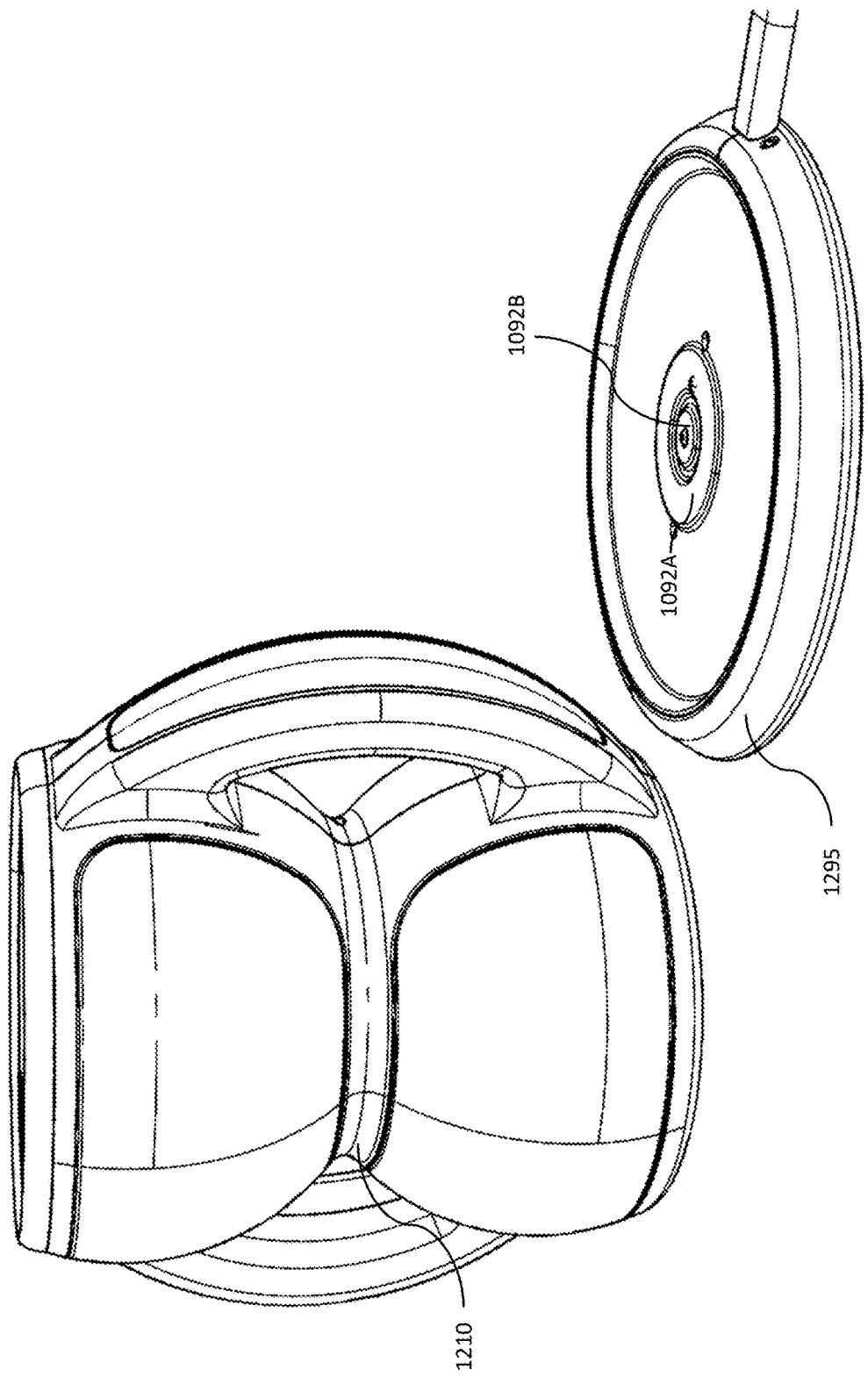
FIG. 12 depicts a possible configuration for a behavioral reinforcement device with a charging base, according to an embodiment of the present disclosure.

FIG. 12 illustrates a behavioral reinforcement system 1200, according to an embodiment. Behavioral reinforcement system 1200 includes a body 1210 and a dock 1295. Dock 1295 includes charging contact 1092A and 1092B that correspond and couple to charging contacts 1090A and 1090B as illustrated in FIG. 10.

Figure 13:
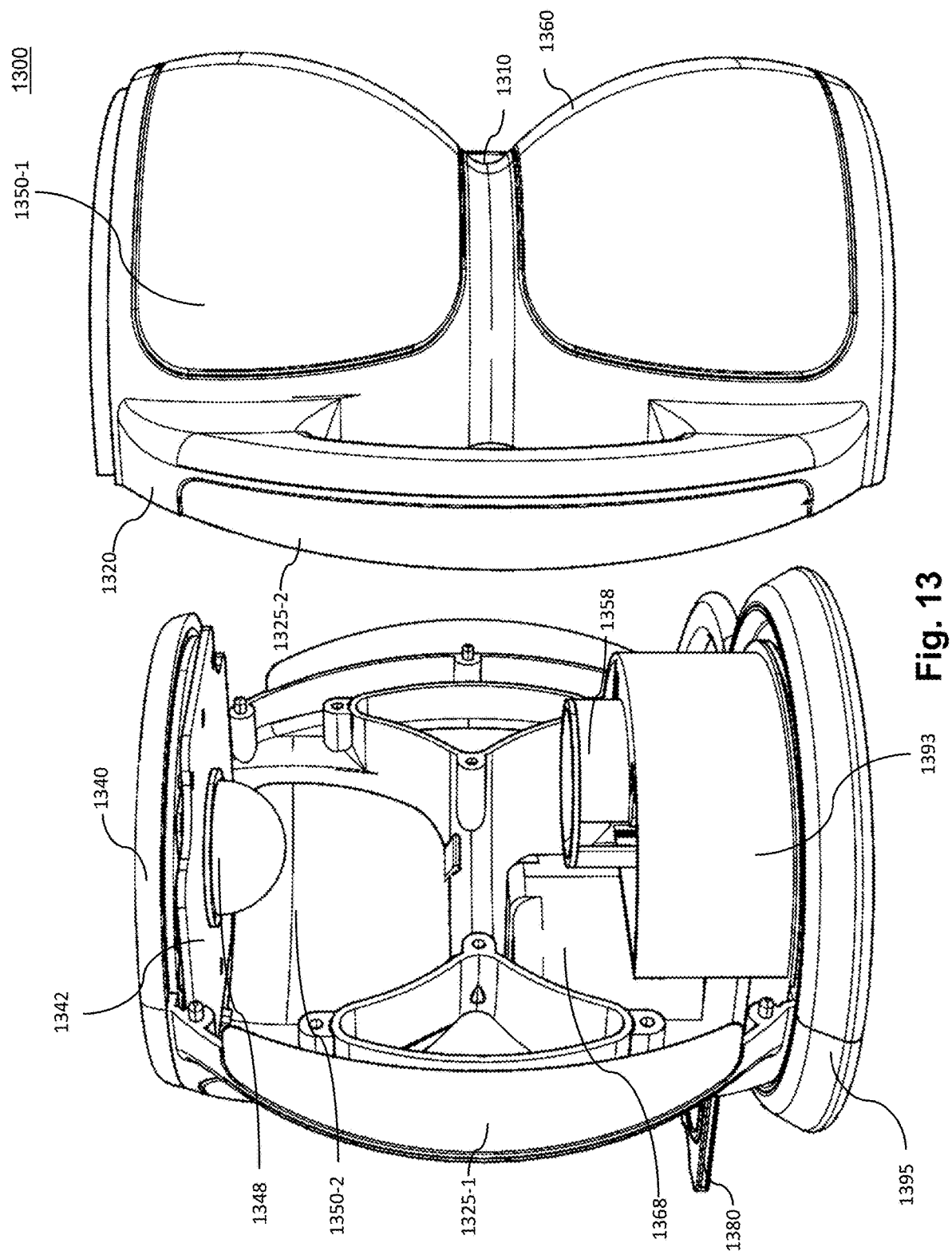
FIG. 13 depicts an internal view of a possible configuration for a behavioral reinforcement device, according to an embodiment of the present disclosure.

FIG. 13 illustrates an internal view of a behavioral reinforcement system 1300, according to an embodiment. Behavioral reinforcement system 1300 includes body 1310, a handle 1320, a recessed area 1325, a bumper 1340, a light 1348, light covers 1350-1 and 1350-2, a speaker 1358, a speaker cover 1360, a token dispenser reservoir 1368, a token tray 1380, a battery housing 1393 and a dock 1395.

In an embodiment, body 1310 includes a handle 1320 that allows behavioral reinforcement system 1300 to be easily controlled and carried by the user. In another embodiment, handle 1320 can be replaced by any number of handles, including no handle at all, where body 1310 could take a cylindrical shape where the user could grip the system without the use of handles. In an embodiment, recessed area 1325 is shown in handle 1320, but as a design choice could be placed at any location on body 1310. As previously discussed, the one or more recessed areas can accommodate decorative stickers or tokens to commemorate successful completion of key performance milestones achieved by a user.

Bumper 1340 is shown incorporated into the top surface of body 1310 to provide protection for various components of behavioral reinforcement system 1300. Light 1348 is located within body 1310 and illuminates a pre-determined color when activated to visually indicate the user's behavioral performance. Light from light 1348 can be seen through light covers 1350-1 and 1350-2. Body 1310 also includes speaker 1358 that is used to produce positive or negative sounds in response to a user's behavioral performance. The speaker is controlled by a processor and software contained within printed circuit board 1342. Speaker cover 1360 is incorporated into the exterior surface of body 1310 and provides protection for the speaker while allowing sound produced by the speaker to be heard by the user.

Printed circuit board 1342 is located within body 1310 and can consist of one or more printed circuit boards and integrated circuits and processors. Printed circuit board 1342 can also include a device control unit, lights, LED arrays, a speaker, an accelerometer, a memory, a storage device, haptic components, antennas, sensors and other electrical components. Sensors, such as an accelerometer or other technology, can record movement of behavioral reinforcement system 1300, including the number or inversions or "flips" of behavioral reinforcement system 1300 over any given period of time. In an alternative mode, the number of flips may be used to measure behavioral performance of a user.

Token dispenser reservoir 1368 is incorporated into body 1310. However, token dispenser reservoir 1368 may be removable from body 1310 to allow a user to more easily reload tokens or maintain token dispenser reservoir 1368. Token tray 1380 can be part of body 1310, or incorporated into token dispenser reservoir 1368, and is used to dispense or load tokens to or from a token dispenser and token dispenser reservoir 1368.

Battery housing 1393 contains a battery that may be permanent or removable, rechargeable and/or replaceable. Dock 1395 is a separate component from body 1310 and can be used as a charging base when dock 1395 is coupled with body 1310.

Figure 14:
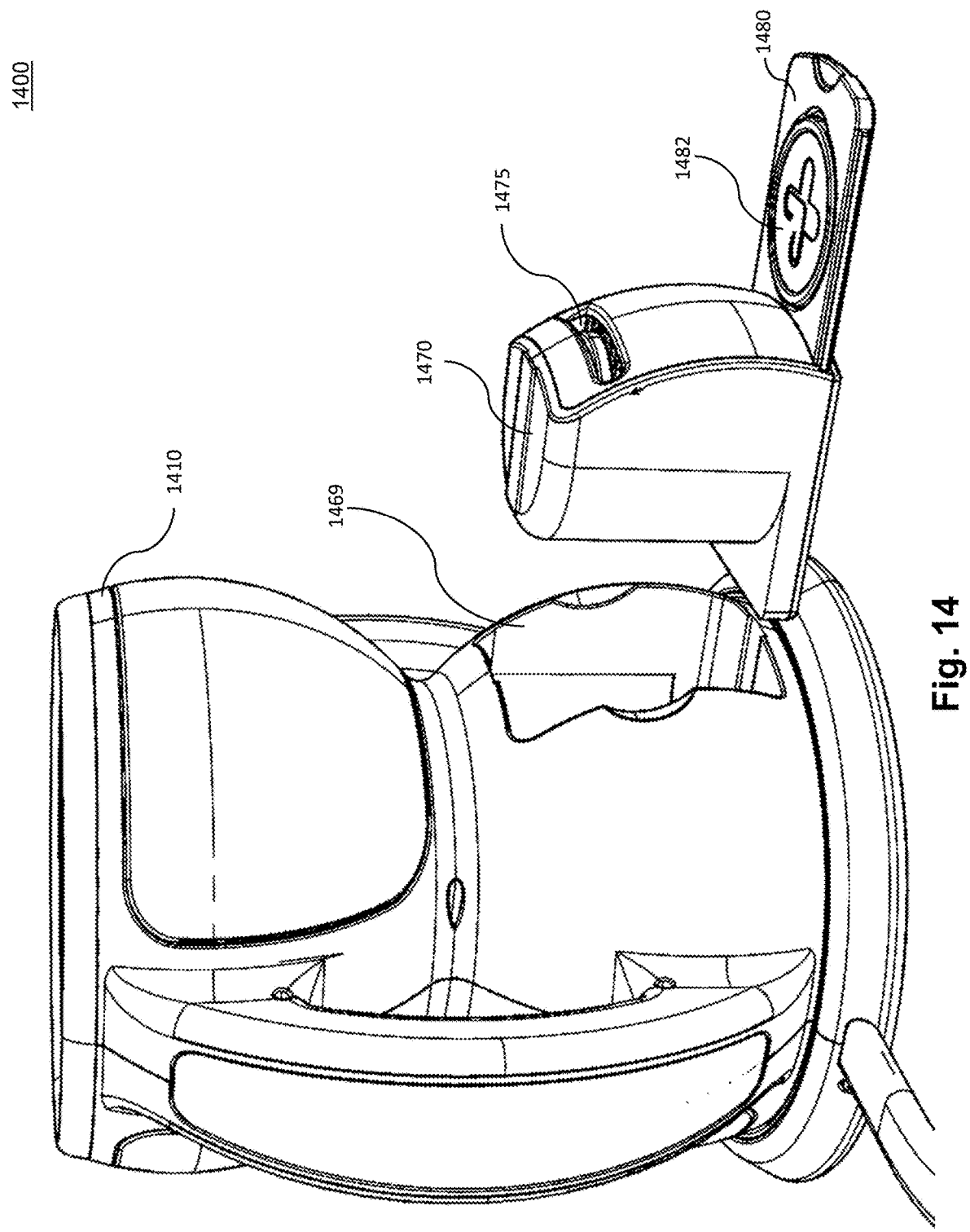
FIG. 14 depicts rear view of a possible configuration for a behavioral reinforcement device with a removable token dispenser, according to an embodiment of the present disclosure.

FIG. 14 illustrates a rear view of a behavioral reinforcement system 1400 with a removable token dispenser, according to an embodiment. Behavioral reinforcement system 1400 includes a body 1410 that includes a token dispenser recess 1469 and a token dispenser 1470. Token dispenser 1470 includes a load opening 1475, a token tray 1480 that is holding a token 1482. In an embodiment, token dispenser 1470 can be completely removed from body 1410 through token dispenser recess 1469. Token dispenser 1470 includes load opening 1475, token tray 1480 and token 1482 that are similarly described in FIG. 4.

Figure 15:
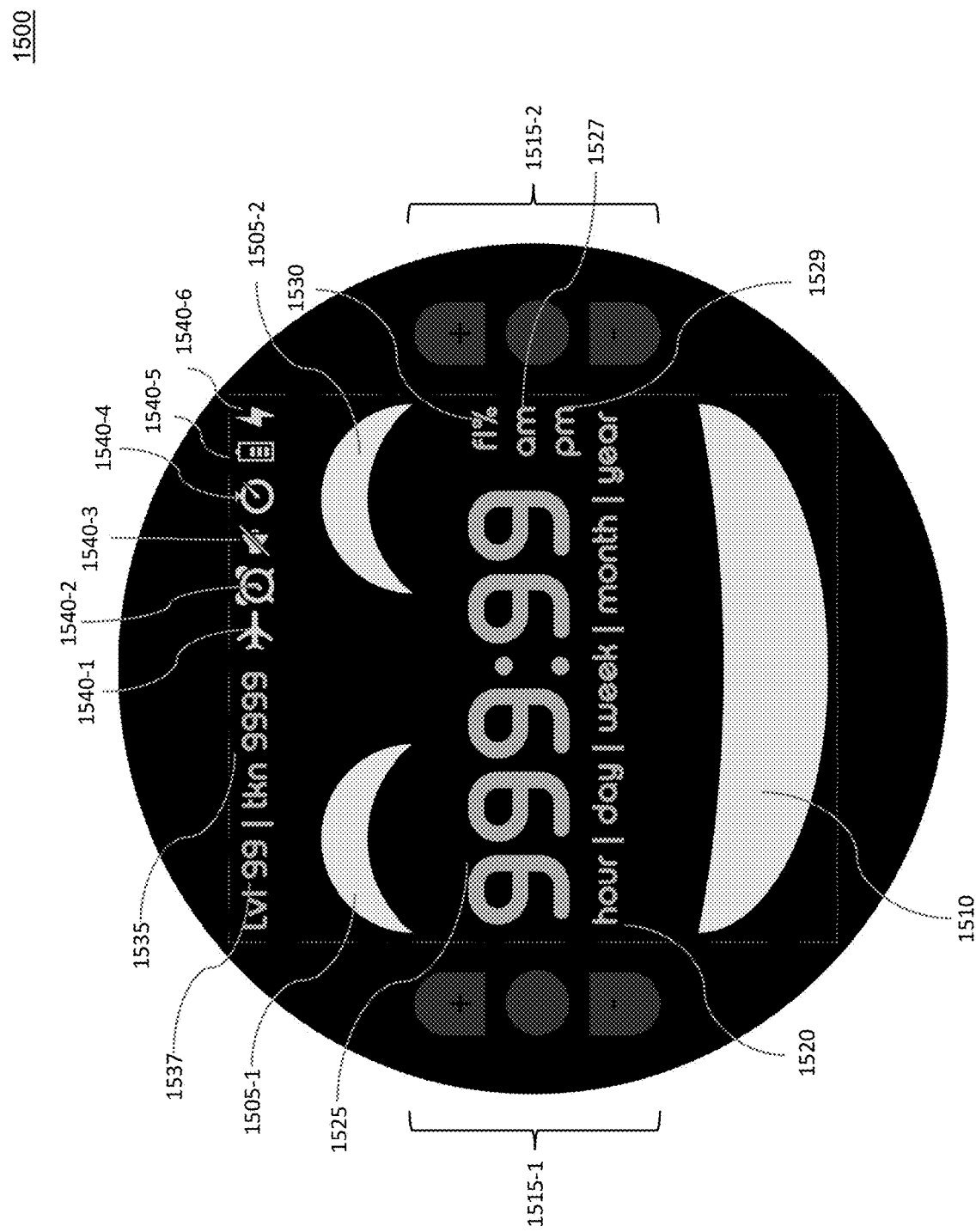
FIG. 15 depicts a possible electronic display for a behavioral reinforcement device, according to an embodiment of the present disclosure.

FIG. 15 illustrates an electronic display of a persona 1500, according to an embodiment. Persona 1500 is one of a possible display on display 330, 430 and 930. Persona 1500 is meant to encourage the user to engage with the behavioral reinforcement systems described in FIGS. 1-14. Persona 1500 is also designed to encourage the user to meet behavioral performance objectives. As the user's behavioral performance improves, persona 1500 presents new graphics on the display, such as emoji-style expressive faces, new colors displayed by lights and sounds played through the speakers further encourage the user to engage with the behavioral reinforcement system and promote improvement.

Persona 1500 includes the ability to display status information, time information and emoji-style expressive faces. Persona 1500 includes persona eyes 1505, a persona mouth 1510, buttons 1515-1 and 1515-2, a time period display 1520 that displays time units, a numeric display 1525, an a.m. indicator 1527, a p.m. indicator 1529, a flip or percentage indicator 1530, a token count 1535, a level count 1537, and status indicators including travel 1540-1, alarm 1540-2, mute 1540-3, timer 1540-4, battery 1540-5 and charge 1540-6.

The behavioral reinforcement system includes functionality typical to a digital clock including date, time, timer, stopwatch and alarm. The user may use the buttons or other control interfaces to set the date and time and alarm, set a timer, input the user's age, gender and other user data, add, subtract or modify performance data, award tokens, activate sounds, change the device use mode, activate and/or deactivate sounds, lights, travel mode, turn the device on/off and reset the device memory. The behavioral reinforcement system may also be water resistant and drop resistant withstanding the wear and tear expected with the use of small children.

The persona eyes 1505 and persona mouth 1510 take on different shapes to produce different stages of happy or sad faces to indicate a user's behavioral performance. Buttons 1515-1 and 1515-2 are used by a user to input data or adjust parameters, options or setup information. Status of the behavioral reinforcement system can include a user's "good time" amounts as displayed in time using numeric display 1525 in conjunction with time period display 1520. "Good time" can also be displayed in terms of "flips" or as a percentage as indicated by the flip or percentage indicator 1530.

In an embodiment, time period display 1520 can include hours, days, weeks, months or years. Persona 1500 also can track a user's behavioral performance based on levels as indicated in level count 1537 or by the number of awarded tokens are indicated in token count 1535. Persona 1500 also can indicate if certain features are active such as being in a "travel" mode, travel 1540-1, where the behavioral reinforcement system will not register movement. Alarm 1540-2 can indicate the usage of a specific time period. Mute 1540-3 indicates that the behavioral reinforcement system will not produce any sounds. Timer 1540-4 indicates a countdown, or count up timer for behavioral performance tracking. Battery 1540-5 can indicate the status of an internal battery and charge 1540-6 indicates the status of being charged.

Figure 16B:
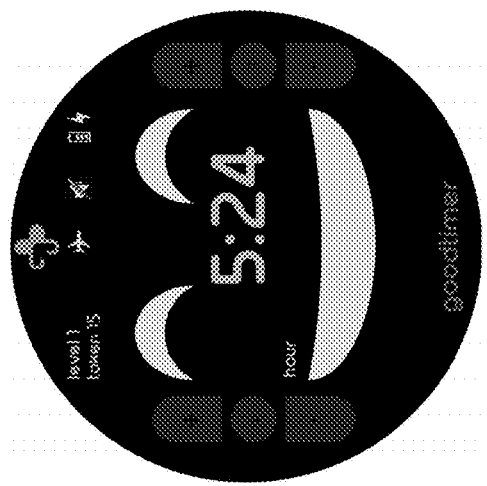
FIGS. 16A, 16B, 16C and 16D depict multiple example personas for a behavioral reinforcement device, according to an embodiment of the present disclosure.
Figure 16D:
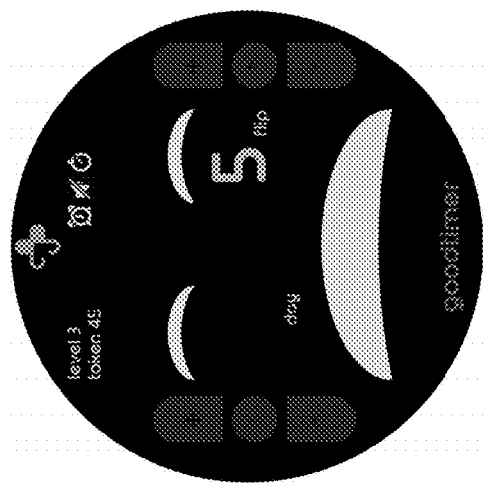
Figure 16A:
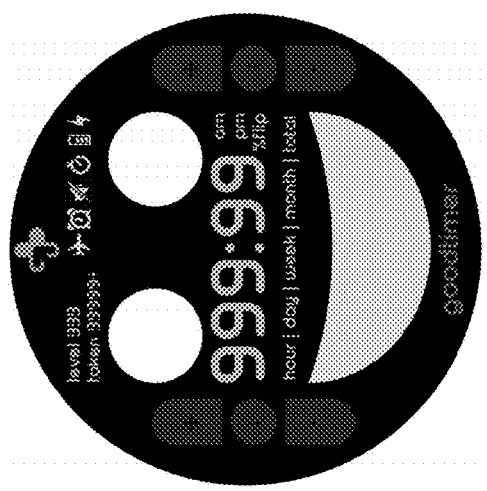

FIGS. 16A, 16B, 16C and 16D illustrate examples of various personas, according to an embodiment. FIG. 16A indicates all of the possible icons. It includes en emoji-style mouth and eyes, a numeric display, a time period display, am and pm indicators, a flip or percentage indicator and status indicators. FIG. 16B indicates a neutral face with 5 minutes and 24 seconds of "Good Time" for the hour. Status indicators show travel mode is enabled, the device is muted, the battery is partially discharged and that the unit is being charged.

Figure 16C:
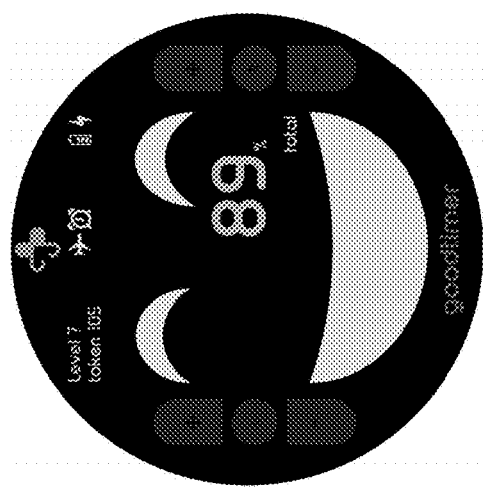

FIG. 16C indicates a happy face with 89% of Good Time earned over the total use of the device. Status indicators show the travel and alarm functions activated and the battery is partially discharged. FIG. 16D indicates a face with 5 flips recorded during the day. Status indicators show the alarm is enabled, the device is muted and a timer is active.

Figure 17:
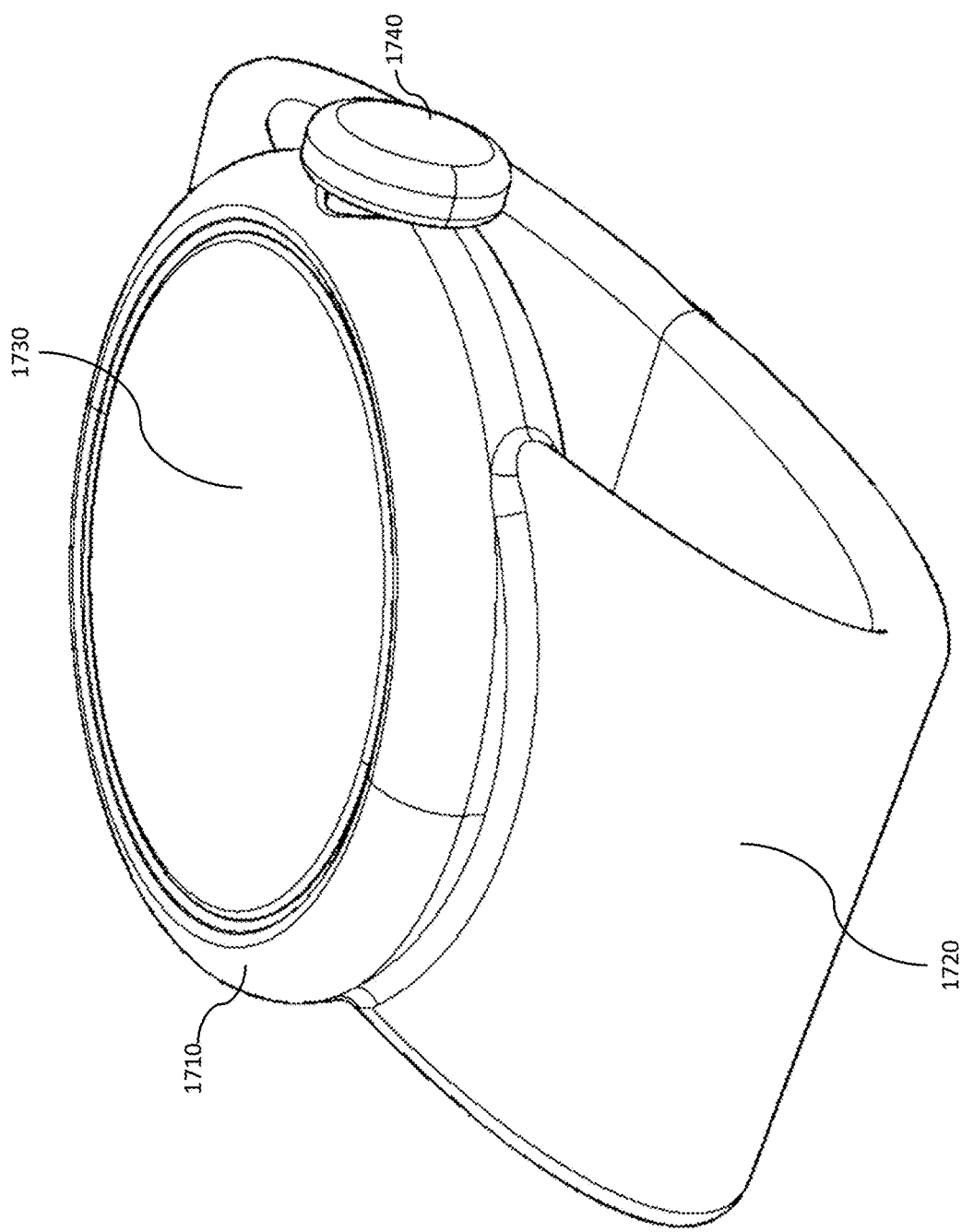
FIG. 17 depicts a wearable remote control device for a behavioral reinforcement device, according to an embodiment of the present disclosure.

FIG. 17 depicts a wearable secondary input device 1700, according to an embodiment. Wearable secondary input device 1700 includes the ability to communicate with a behavioral reinforcement device. In an embodiment, wearable secondary input device 1700 can take the form of a computer, tablet, smartphone, smart-watch, etc. Wearable secondary input device 1700 can utilize an application or web interface. Wearable secondary input device 1700 can be used to gather user behavioral performance data from a behavioral reinforcement device when separated from the behavioral reinforcement device utilizing communications such as Wi-Fi, Bluetooth or cellular technology.

Wearable secondary input device 1700 includes a body 1710, a display 1730, a band 1720 and a crown 1740, according to an embodiment. Body 1710 includes electronic components such as a controller, accelerometer, battery, speaker, haptic components and communication capabilities. Display 1730 may include a visual display with color-coded lights corresponding to a user's behavioral performance and may utilize LCD, LED, e-ink or other electronic display technologies. Band 1720 can be any type of band to be worn by a user. Crown 1740 is used as a control device to select or input information. Further, display 1730 can be touch sensitive and used to input information.

FIGS. 18A and 18B depict a wearable secondary input device 1800, according to an embodiment. FIG. 18A is a front view of wearable secondary input device 1800. FIG. 18B is a side view of wearable secondary input device 1800'. Wearable secondary input device 1800 includes a body 1810, a band 1820, a crown 1840 as described in FIG. 17. Wearable secondary input device 1800 also includes the display of a persona 1850 using performance e-graphics 1855. Persona 1850, as previously described can use emoji-style graphics, text and numbers to convey behavioral performance.

FIG. 19 depicts a communications scheme 1900 between a wearable secondary input device and a behavioral reinforcement device, according to an embodiment. Communications scheme 1900 includes a child 1905 wearing a wearable secondary input device 1920 that is in two-way communications with behavioral reinforcement device 1910. Wearable secondary input device 1920 allows the ability to track and collect behavioral performance remotely and then to communicate the collected behavioral information back to behavioral reinforcement device 1910.

Figure 20:
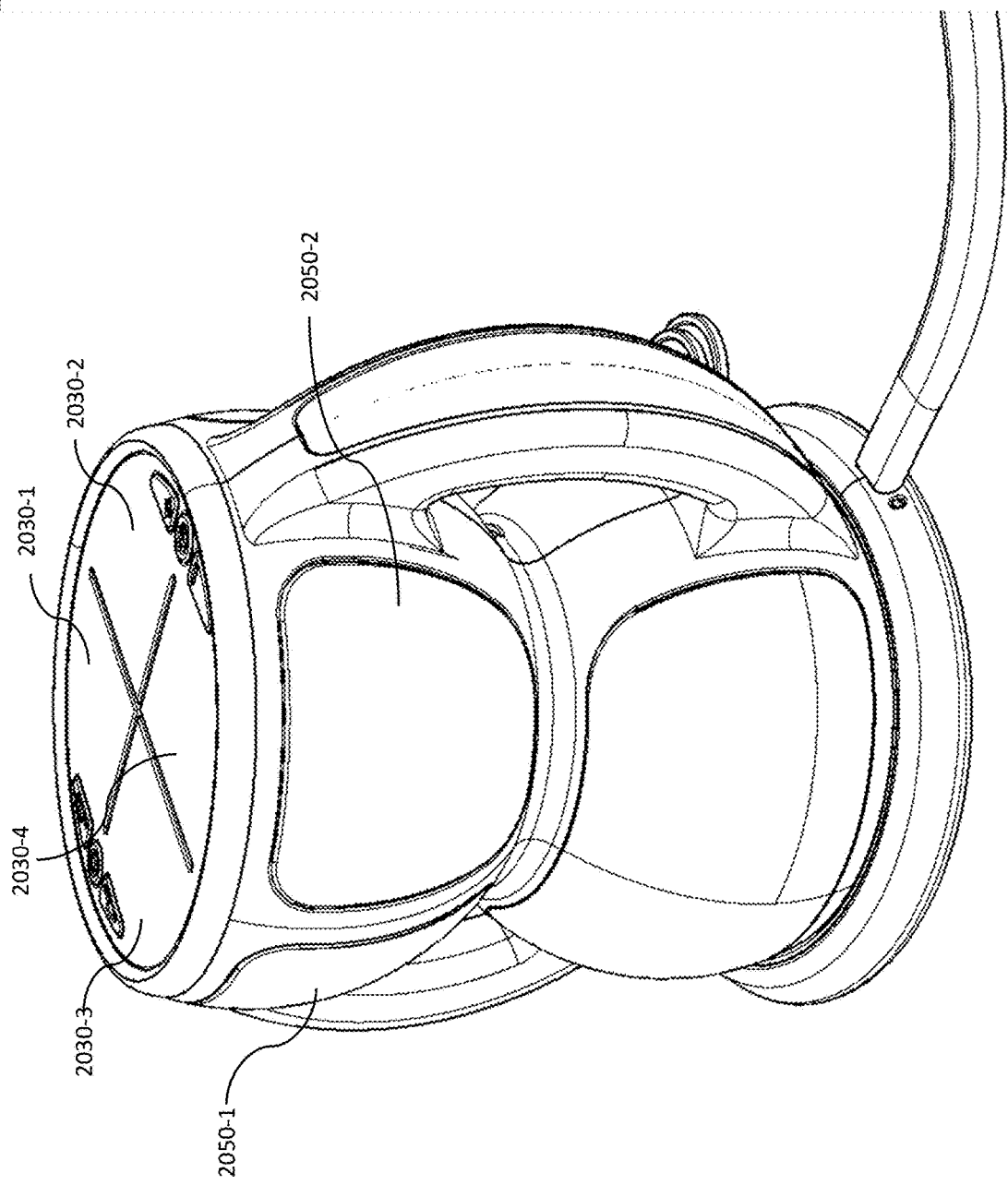
FIG. 20 depicts a possible configuration for a behavioral reinforcement device for multiple users, according to an embodiment of the present disclosure.
Figure 21:
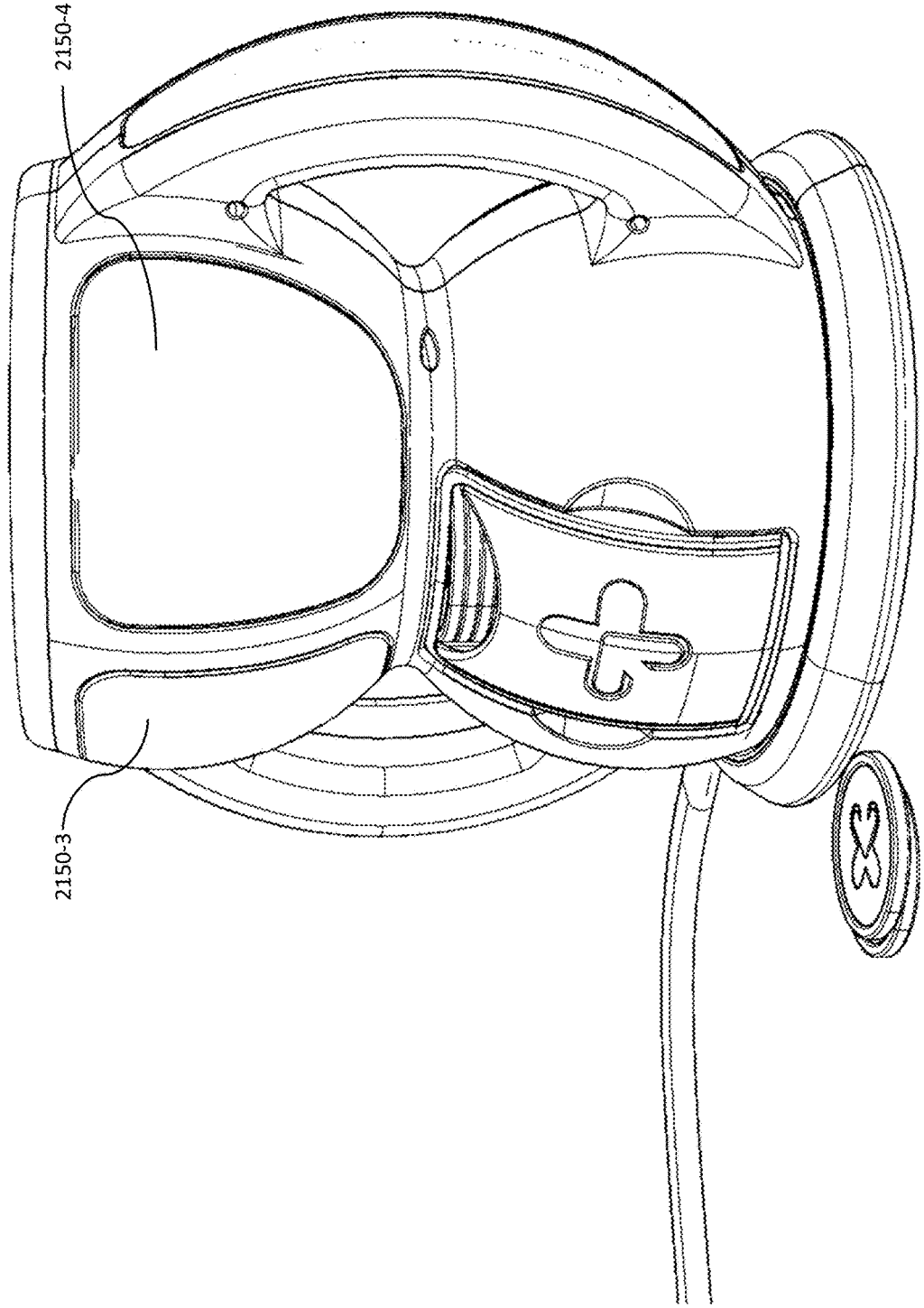
FIG. 21 depicts a rear view of a possible configuration for a behavioral reinforcement device for multiple users, according to an embodiment of the present disclosure.
Figure 22:
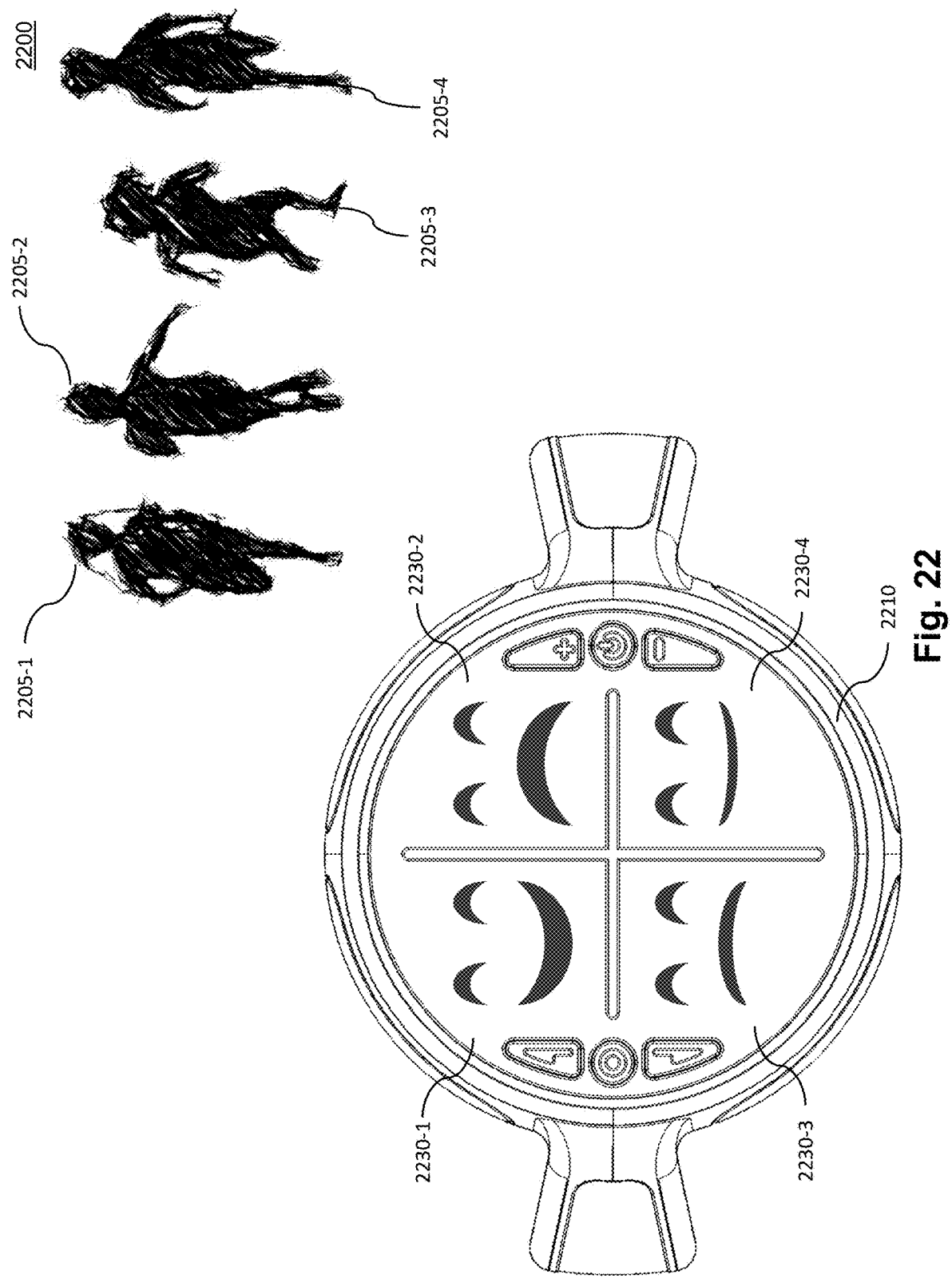
FIG. 22 depicts a top view of a possible configuration for a behavioral reinforcement device for multiple users, according to an embodiment of the present disclosure.

FIGS. 20, 21 and 22 are directed to a behavioral reinforcement device for multiple users, according to an embodiment. FIG. 20 depicts behavioral reinforcement device 2000 for multiple users, according to an embodiment. Behavioral reinforcement device 2000 includes a display 2030 split into quadrants 2030-1, 2030-2, 2030-3 and 2030-4. Each display quadrant represents a different user and would display information in a similar manner to display 330 discussed in FIG. 3 and display 430 in FIG. 4. Each display segment can be viewed and controlled separately by a device control interface such as the buttons described in FIG. 3. In another embodiment, display 2030 would consist of a single display, but with different user's information displayed at different times. Display information associated with different users would be based on user input or communications from a remote device such as wearable secondary input device 1700.

Behavioral reinforcement device 2000 also includes light regions 2050-1 and 2050-2. As with display 2030, light regions 2050-1 and 2050-2 can display multiple colors and multiple light regions where each region corresponds to a different child. Each light region may be activated or deactivated independently displaying the unique performance of each child. Additionally, unique sounds and graphics including user-specific sounds may be activated to differentiate the performance of each child. FIG. 21 depicts behavioral reinforcement device 2100 for multiple users, according to an embodiment with additional light regions 2150-3 and 2150-4.

FIG. 22 depicts a multiple user behavioral reinforcement system 2200, according to an embodiment. Multiple user behavioral reinforcement system 2200 includes a body 2210 of a behavioral reinforcement device that includes display quadrant 2230-1, 2230-2, 2230-3 and 2230-4. Display quadrant 2230-1 corresponds to child 2205-1, display quadrant 2230-2 corresponds to child 2205-2, display quadrant 2230-3 corresponds to child 2205-3, and display quadrant 2230-4 corresponds to child 2205-4. Note that the display icons on display 2230 for each child's behavioral performance are different from each other.

Figure 23:
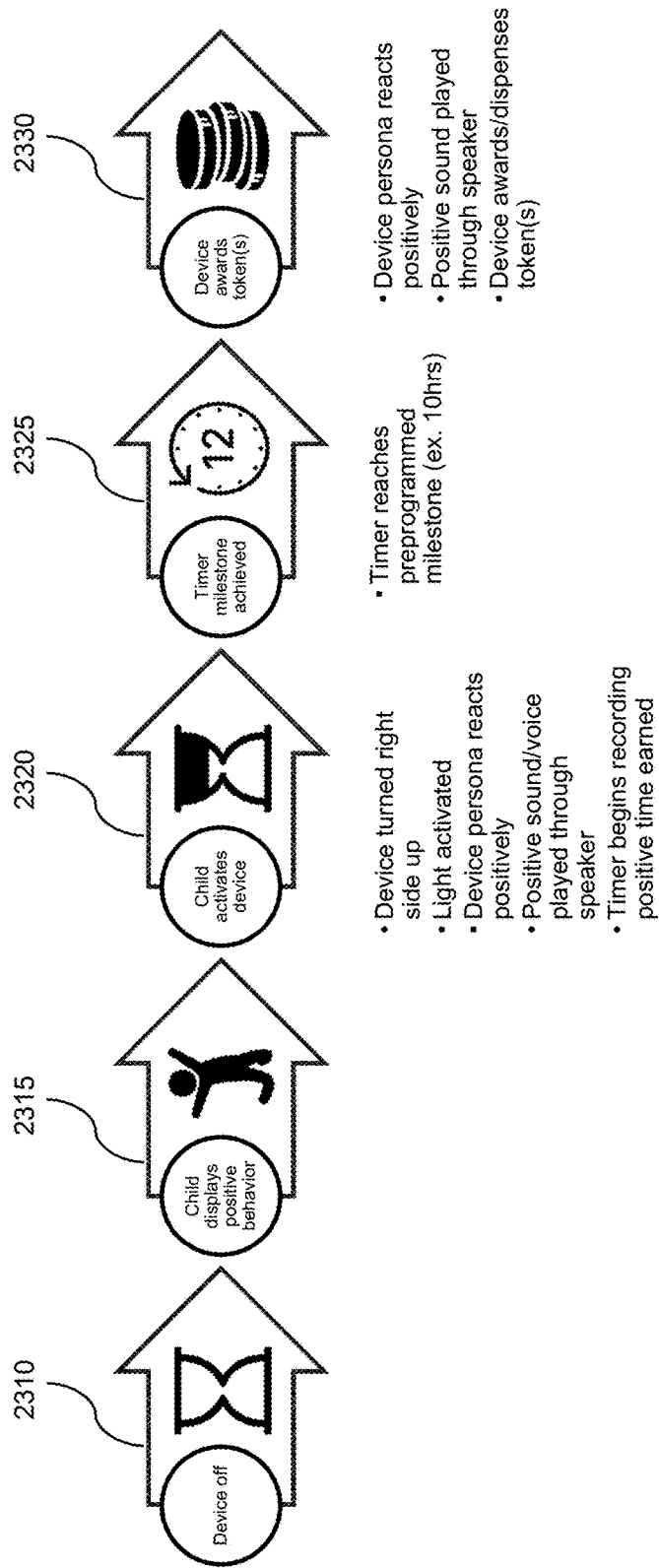
FIG. 23 depicts a flowchart for a device activation sequence utilizing a behavioral reinforcement device, according to an embodiment of the present disclosure.

FIG. 23 depicts a method sequence 2300 for device activation for a behavioral reinforcement system, according to an embodiment. The method starts at 2310 with the behavioral reinforcement device in an "off" state. At 2315, upon start-up or when a child, the user, displays positive behaviors the caregiver may instruct the child to turn the behavioral reinforcement device right-side-up to an upright position. At 2320, sensors, such as an accelerometer or other technology inside the behavioral reinforcement device recognize that the behavioral reinforcement device has been activated. A light within the behavioral reinforcement device is activated and a displayed persona reacts positively including a visual graphic on the behavioral reinforcement device display and a positive sound or voice is played through the behavioral reinforcement device speaker. The behavioral reinforcement device may also be activated in travel mode through the push-button control interface. The behavioral reinforcement device may also vibrate using internal haptic components. The behavioral reinforcement device begins/continues tracking the amount of time the child is earning, saving this data to the device onboard memory and/or an alternative connected memory source (e.g., connected device, local server, or cloud-database). At 2325, when the child earns enough time corresponding to a milestone programmed into the device software, the device awards one or multiple tokens. At 2330, the behavioral reinforcement device persona may again react positively as displayed on the behavioral reinforcement device display, a positive sound may be played through the behavioral reinforcement device speakers and the behavioral reinforcement device light may display a special light sequence. The behavioral reinforcement device may also vibrate using internal haptic components.

Figure 24:
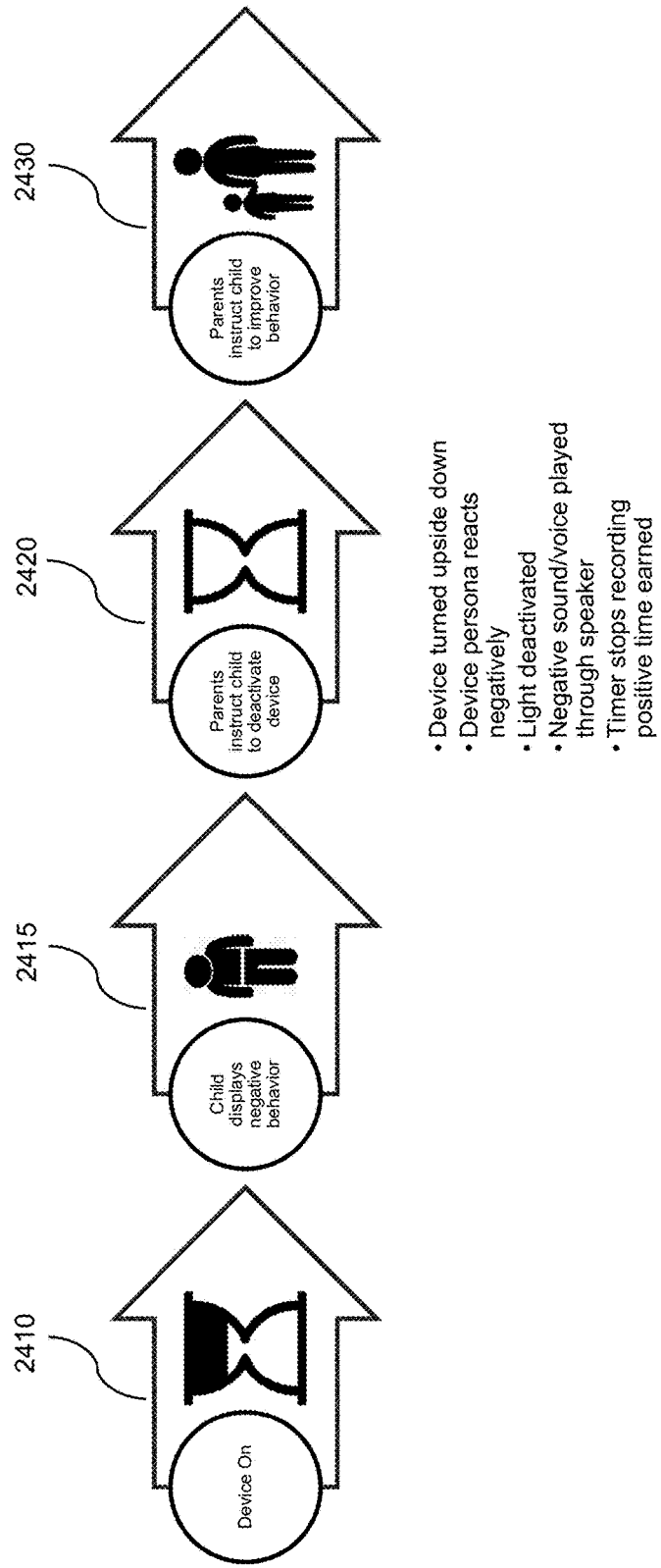
FIG. 24 depicts a flowchart for a device deactivation sequence utilizing a behavioral reinforcement device, according to an embodiment of the present disclosure.

FIG. 24 depicts a method sequence 2400 for device deactivation for a behavioral reinforcement system, according to an embodiment. The method starts at 2410 with the behavioral reinforcement device in an "on" state. At 2415, when the child displays negative behavior the caregiver may instruct the child to turn, or invert, the behavioral reinforcement device to an upside down position. At 2420, sensors, such as an accelerometer or other technology inside the device recognizes the behavioral reinforcement device has been deactivated at which point the light is deactivated, the behavioral reinforcement device persona reacts negatively. The negative persona reaction can include a visual graphic displayed on the behavioral reinforcement device display and a negative sound or voice is played through the behavioral reinforcement device speaker. The behavioral reinforcement device may also be deactivated in travel mode through the push-button control interface. The behavioral reinforcement device may also vibrate using internal haptic components. Finally, the behavioral reinforcement device stops tracking the amount of time the child is earning. At 2430, caregivers will be guided to use this opportunity to discipline their child and instruct them toward improved or desired behaviors. Once the behavior is corrected the caregiver may instruct the child to reactivate the device.

CONCLUSION

The summary and abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments.

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

I claim:

1. A behavioral reinforcement device comprising:
   a housing comprising an electronic display, wherein the electronic display is configured to display a user's behavioral performance symbolically, wherein the housing comprises a portable body shape;
   a sensor configured to detect a user input; and
   a token dispenser incorporated into the housing configured to dispense a physical token,
   wherein upon the sensor detecting a user input comprising placing the behavioral reinforcement device into a first predefined positional orientation, a controller is configured to execute a device activation sequence in which the behavioral reinforcement device is activated and wherein upon the sensor detecting a user input comprising placing the behavioral reinforcement device into a second predefined positional orientation, the controller is configured to execute a device deactivation sequence in which the behavioral reinforcement device is deactivated, and
   wherein an activation of the behavioral reinforcement device starts an accrual of good time earned and a deactivation of the behavioral reinforcement device pauses the accrual of good time earned.

2. The behavioral reinforcement device of claim 1, wherein the housing comprises an hour-glass body.

3. The behavioral reinforcement device of claim 1, wherein the housing comprises a handle.

4. The behavioral reinforcement device of claim 1, wherein the user input further comprises a motion of the behavioral reinforcement device.

5. The behavioral reinforcement device of claim 1, wherein the user input comprises an inversion of the housing from the first predefined positional orientation to the second predefined positional orientation.

6. The behavioral reinforcement device of claim 1, wherein the controller executes the device deactivation sequence if the behavioral reinforcement device is inverted from right side up to upside down.

7. The behavioral reinforcement device of claim 1, further comprising a light feature configured to illuminate a predetermined positive color or a negative color to visually indicate the user's behavioral performance to provide behavioral reinforcement.

8. The behavioral reinforcement device of claim 1, further comprising a sound generator configured to generate a predetermined positive sound and a negative sound to auditorially indicate a user's positive or negative performance respectively to provide behavioral reinforcement.

9. The behavioral reinforcement device of claim 1, wherein the token dispenser is removable from the housing.

10. The behavioral reinforcement device of claim 9, wherein the removable token dispenser is wirelessly coupled to the behavioral reinforcement device.

11. The behavioral reinforcement device of claim 1, further configured to wirelessly communicate with a wearable remote device.

12. The behavioral reinforcement device of claim 1, wherein the electronic display is further configured to display a persona comprising a plurality of positive and negative emoji-style expressive faces based on the user's behavioral performance.

13. The behavioral reinforcement device of claim 1, wherein the electronic display is further configured to simultaneously display behavioral performance of a plurality of users symbolically.

14. The behavioral reinforcement device of claim 1, wherein the activation of the behavioral reinforcement device and the deactivation of the behavioral reinforcement device constitutes an inversion of the behavioral reinforcement device, wherein the behavioral reinforcement device records a quantity of inversions during a given period of time as an indicator of behavioral performance.

15. A behavioral reinforcement method comprising:
   using a behavioral reinforcement device comprising a portable cylindrical shaped housing configured for physical interaction with a user to reinforce positive behavioral performance of the user; and
   placing, by the user, the behavioral reinforcement device into an active state based on a physical movement of the behavioral reinforcement device into a first predefined positional orientation and placing, by the user, the behavioral reinforcement device into an inactive state based on a physical movement of the behavioral reinforcement device into a second predefined positional orientation;
   wherein the placing of the behavioral reinforcement device into an active state starts an accrual of good time earned and the placing of the behavioral reinforcement device into an inactive state pauses the accrual of good time earned;
   where upon placing the behavioral reinforcement device in an active state:
      a positive sound is generated by the behavioral reinforcement device; and
      a timer begins recording positive time earned by the user;
         where upon the timer reaching a preprogrammed milestone a persona reacts positively and a physical token is dispensed by the behavioral reinforcement device.

16. The behavioral reinforcement method of claim 15, wherein if the user displays negative behavior the user is instructed to deactivate the behavioral reinforcement device wherein:
   a persona in the behavioral reinforcement device reacts negatively;
   a negative sound is generated by the behavioral reinforcement device; and
   a timer stops recording positive time earned by the user.

17. The behavioral reinforcement method of claim 15, wherein the first predefined positional orientation of the behavioral reinforcement device is an upright position.

18. The behavioral reinforcement method of claim 15, wherein the second predefined positional orientation of the behavioral reinforcement device is an upside down position.

19. The behavioral reinforcement method of claim 15, further comprising illuminating a light feature with a positive color when the behavioral reinforcement device is in an active state.

20. The behavioral reinforcement method of claim 15, further comprising displaying behavioral performance of the user symbolically.

21. The behavioral reinforcement method of claim 15, wherein the placing of the behavioral reinforcement device into an active state and the placing of the behavioral reinforcement device into an inactive state constitutes an inversion of the behavioral reinforcement device, wherein the behavioral reinforcement device records a quantity of inversions during a given period of time as an indicator of behavioral performance.

\* \* \* \* \*